(12) United States Patent
Seo et al.

(10) Patent No.: US 9,936,405 B2
(45) Date of Patent: Apr. 3, 2018

(54) METHOD FOR PERFORMING MEASUREMENT IN WIRELESS COMMUNICATIONS SYSTEM AND APPARATUS THEREFOR

(71) Applicant: LG ELECTRONICS INC., Seoul (KR)

(72) Inventors: Inkwon Seo, Seoul (KR); Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 157 days.

(21) Appl. No.: 14/782,998

(22) PCT Filed: May 7, 2014

(86) PCT No.: PCT/KR2014/004008
§ 371 (c)(1),
(2) Date: Oct. 7, 2015

(87) PCT Pub. No.: WO2014/182041
PCT Pub. Date: Nov. 13, 2014

(65) Prior Publication Data
US 2016/0050575 A1 Feb. 18, 2016

Related U.S. Application Data

(60) Provisional application No. 61/820,686, filed on May 7, 2013, provisional application No. 61/821,693, filed
(Continued)

(51) Int. Cl.
*H04W 24/08* (2009.01)
*H04B 7/26* (2006.01)
(Continued)

(52) U.S. Cl.
CPC .............. *H04W 24/08* (2013.01); *H04B 7/26* (2013.01); *H04B 17/345* (2015.01);
(Continued)

(58) Field of Classification Search
CPC .... H04W 24/08; H04W 72/04; H04B 17/345; H04B 7/26; H04B 17/24; H04L 5/0035; H04L 5/14
See application file for complete search history.

(56) References Cited

U.S. PATENT DOCUMENTS

2010/0271968 A1 10/2010 Liu et al.
2012/0236736 A1* 9/2012 Frank .................... H04W 24/04
370/252
(Continued)

FOREIGN PATENT DOCUMENTS

CN 101159475 A 4/2008
CN 102149099 A 8/2011
(Continued)

OTHER PUBLICATIONS

Alcatel-Lucent Shanghai Bell et al., "Interference Mitigation TDD eIMTA," 3GPP TSG RAN WG1 Meeting #72bis, R1-130936, Chicago, USA, Apr. 16-19, 2013, 5 pages, XP050696935.
(Continued)

*Primary Examiner* — Hashim Bhatti
(74) *Attorney, Agent, or Firm* — Birch, Stewart, Kolasch & Birch, LLP

(57) ABSTRACT

A method for performing measurement by a terminal in a wireless communications system according to an embodiment of the present invention includes the steps of: receiving from a first transmission point the uplink-downlink structures associated respectively with a second transmission point and a third transmission point; and determining at least one measurement set based on the received uplink-downlink
(Continued)

structures, wherein each measurement set consists of the sub-frames that: the duplex direction combination during a particular time interval in the case of following the uplink-downlink structure associated with the second transmission point is the same as the duplex direction combination during the particular time interval in the case of following the uplink-downlink structure associated with the third transmission point.

10 Claims, 11 Drawing Sheets

Related U.S. Application Data on May 9, 2013, provisional application No. 61/827,018, filed on May 24, 2013, provisional application No. 61/861,435, filed on Aug. 2, 2013, provisional application No. 61/862,957, filed on Aug. 6, 2013.

(51) Int. Cl.
  *H04W 72/04* (2009.01)
  *H04B 17/345* (2015.01)
  *H04L 5/14* (2006.01)
  *H04L 5/00* (2006.01)
  *H04B 17/24* (2015.01)

(52) U.S. Cl.
  CPC ............ *H04W 72/04* (2013.01); *H04B 17/24* (2015.01); *H04L 5/0035* (2013.01); *H04L 5/14* (2013.01)

(56) References Cited

U.S. PATENT DOCUMENTS

| | | | |
|---|---|---|---|
| 2013/0021925 A1 | 1/2013 | Yin et al. | |
| 2013/0242812 A1* | 9/2013 | Khoryaev | H04W 72/0413 370/278 |
| 2013/0260763 A1* | 10/2013 | Bhattad | H04W 36/0088 455/436 |
| 2013/0322235 A1* | 12/2013 | Khoryaev | H04W 24/10 370/229 |
| 2014/0056272 A1 | 2/2014 | Gao et al. | |
| 2014/0064133 A1* | 3/2014 | Kazmi | H04W 24/10 370/252 |
| 2014/0126501 A1 | 5/2014 | Pan et al. | |
| 2014/0160967 A1* | 6/2014 | Gao | H04W 24/10 370/252 |
| 2014/0192672 A1 | 7/2014 | Seo et al. | |
| 2014/0301251 A1* | 10/2014 | Chen | H04W 72/02 370/278 |
| 2014/0307591 A1* | 10/2014 | Wang | H04W 72/1231 370/278 |
| 2015/0270933 A1* | 9/2015 | Feng | H04B 7/2656 370/280 |
| 2015/0365941 A1* | 12/2015 | Liu | H04W 72/0446 370/280 |
| 2016/0029239 A1* | 1/2016 | Sadeghi | H04W 52/244 370/252 |
| 2016/0066281 A1* | 3/2016 | Ouchi | H04W 52/04 370/280 |

FOREIGN PATENT DOCUMENTS

| | | |
|---|---|---|
| CN | 102595436 A | 7/2012 |
| EP | 2665305 A1 | 11/2013 |
| KR | 10-2012-0007526 A | 1/2012 |
| WO | WO 2012/142913 A1 | 10/2012 |
| WO | WO 2013/015626 A2 | 1/2013 |
| WO | WO 2013/048121 A1 | 4/2013 |

OTHER PUBLICATIONS

Alcatel-Lucent Shanghai Bell et al., "Signalling mechanisms for TDD UL-DL reconfiguration," 3GPP TSG RAN WG1 Meeting #72bis, R1-130937, Chicago, USA, Apr. 15-19, 2013, 2 pages, XP050696936.

Huawei et al., "SDIM for TDD eIMTA," 3GPP TSG RAN WG1 meeting #72bis, R1-131160, Chicago, USA, Apr. 15-19, 2013, 3 pages, XP050697078.

* cited by examiner

FIG. 5
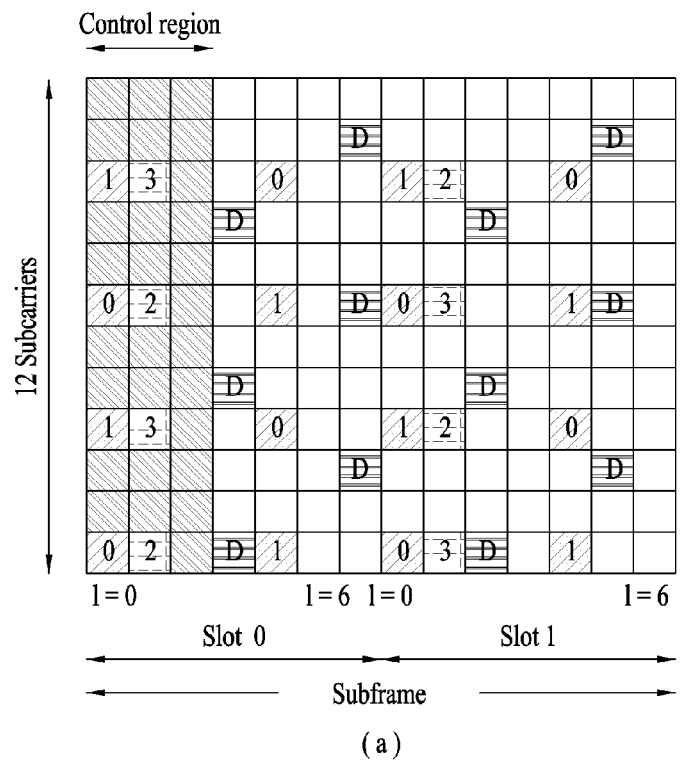
(a)
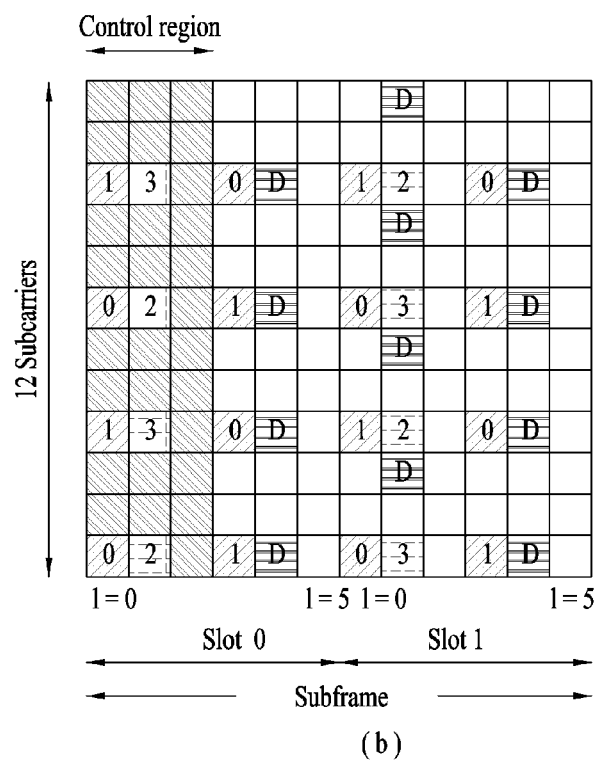
(b)

FIG. 6

METHOD FOR PERFORMING MEASUREMENT IN WIRELESS COMMUNICATIONS SYSTEM AND APPARATUS THEREFOR

CROSS REFERENCE TO RELATED APPLICATIONS

This application is the National Phase of PCT International Application No. PCT/KR2014/004008, filed on May 7, 2014, which claims priority under 35 U.S.C. 119(e) to U.S. Provisional Application No. 61/820,686, filed on May 7, 2013, U.S. Provisional Application No. 61/821,693, filed on May 9, 2013, U.S. Provisional Application No. 61/827,018, filed on May 24, 2013, U.S. Provisional Application No. 61/861,435, filed on Aug. 2, 2013, and U.S. Provisional Application No. 61/862,957, filed on Aug. 6, 2013, all of which are hereby expressly incorporated by reference into the present application.

TECHNICAL FIELD

The present invention relates to a wireless communication system, and more particularly, to a method for performing measurement in wireless communications system and apparatus therefor.

BACKGROUND ART

Wireless communication systems have been widely deployed to provide various types of communication services such as voice or data services. Generally, a wireless communication system is a multiple access system capable of supporting communication with multiple users by sharing available system resources (bandwidth, transmit power, etc.). Multiple access systems include, for example, a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, a multi carrier frequency division multiple access (MC-FDMA) system, etc.

DISCLOSURE OF THE INVENTION

Technical Task

The technical task of the present invention is to provide a method for performing measurements in various interference situations as well as a system for using changed usage of a subframe in TDD.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a $1^{st}$ technical aspect of the present invention, provided herein is a method of performing measurement, which is performed by a user equipment in a wireless communication system, including the steps of receiving a UL-DL (uplink-downlink) configuration related to a $2^{nd}$ transmission point and a UL-DL configuration related to a $3^{rd}$ transmission point from a $1^{st}$ transmission point and determining at least one or more measurement sets based on the received UL-DL configurations, wherein each of the at least one or more measurement sets is composed of subframes with a same combination of a duplex direction in a specific time interval in accordance with the UL-DL configuration related to the $2^{nd}$ transmission point and a duplex direction in the specific time interval in accordance with the UL-DL configuration related to the $3^{rd}$ transmission point.

In a $2^{nd}$ technical aspect of the present invention, provided herein is in performing measurement in a wireless communication system, a user equipment including a receiving module and a processor configured to receive a UL-DL (uplink-downlink) configuration related to a $2^{nd}$ transmission point and a UL-DL configuration related to a $3^{rd}$ transmission point from a $1^{st}$ transmission point, the processor configured to determine at least one or more measurement sets based on the received UL-DL configurations, wherein each of the at least one or more measurement sets is composed of subframes with a same combination of a duplex direction in a specific time interval in accordance with the UL-DL configuration related to the $2^{nd}$ transmission point and a duplex direction in the specific time interval in accordance with the UL-DL configuration related to the $3^{rd}$ transmission point.

The following matters may be included in the $1^{st}$ to $2^{nd}$ technical aspects of the present invention.

Preferably, the method of performing the measurement may further include the step of performing the measurement on the at least one or more measurement sets More preferably, in the each of the at least one or more measurement sets, measurement results of subframes included in a measurement window may be calculated as an average value.

Further preferably, if UL-DL configurations within the measurement window are reconfigured, the measurement results may be calculated as the average value Further preferably, if the UL-DL configurations relate to a usage change of an uplink subframe into a downlink subframe, the average value may be calculated based on measurement results of subframes unrelated to the usage change only.

More preferably, grouping may be performed on measurement sets corresponding to a combination of specific duplex directions among the at least one or more measurement sets.

Further preferably, the combination of the specific duplex directions may be indicated by the $1^{st}$ transmission point.

More preferably, the subframes included in the each of the at least one or more measurement sets may be used for downlink transmission in the $1^{st}$ transmission point.

Preferably, if the subframes included in the each of the at least one or more measurement sets are used for uplink transmission in the $1^{st}$ transmission point, uplink transmit power may be independently determined in the each of the at least one or more measurement sets.

More preferably, at least one of an uplink transmit power parameter and a transmit power control mode may be determined in the each of the at least one or more measurement sets.

Preferably, the method of performing the measurement may further include the step of performing the measurement for n of measurement sets among the at least one or more measurement sets according to priority.

Preferably, if the $2^{nd}$ transmission point corresponds to a dominant interferer, a measurement set may be determined through a logical OR operation of downlink subframes in a measurement subframe set previously configured in each UL-DL configuration index of the $2^{nd}$ transmission point and a UL-DL configuration of the $1^{st}$ transmission point.

Advantageous Effects

According to the present invention, accurate measurement can be performed in a manner of reflecting interference characteristics caused by usage change of a subframe in TDD.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram to describe a reference signal.

FIG. 6 is a diagram to describe a channel state information reference signal.

BEST MODE FOR INVENTION

Figure 1:
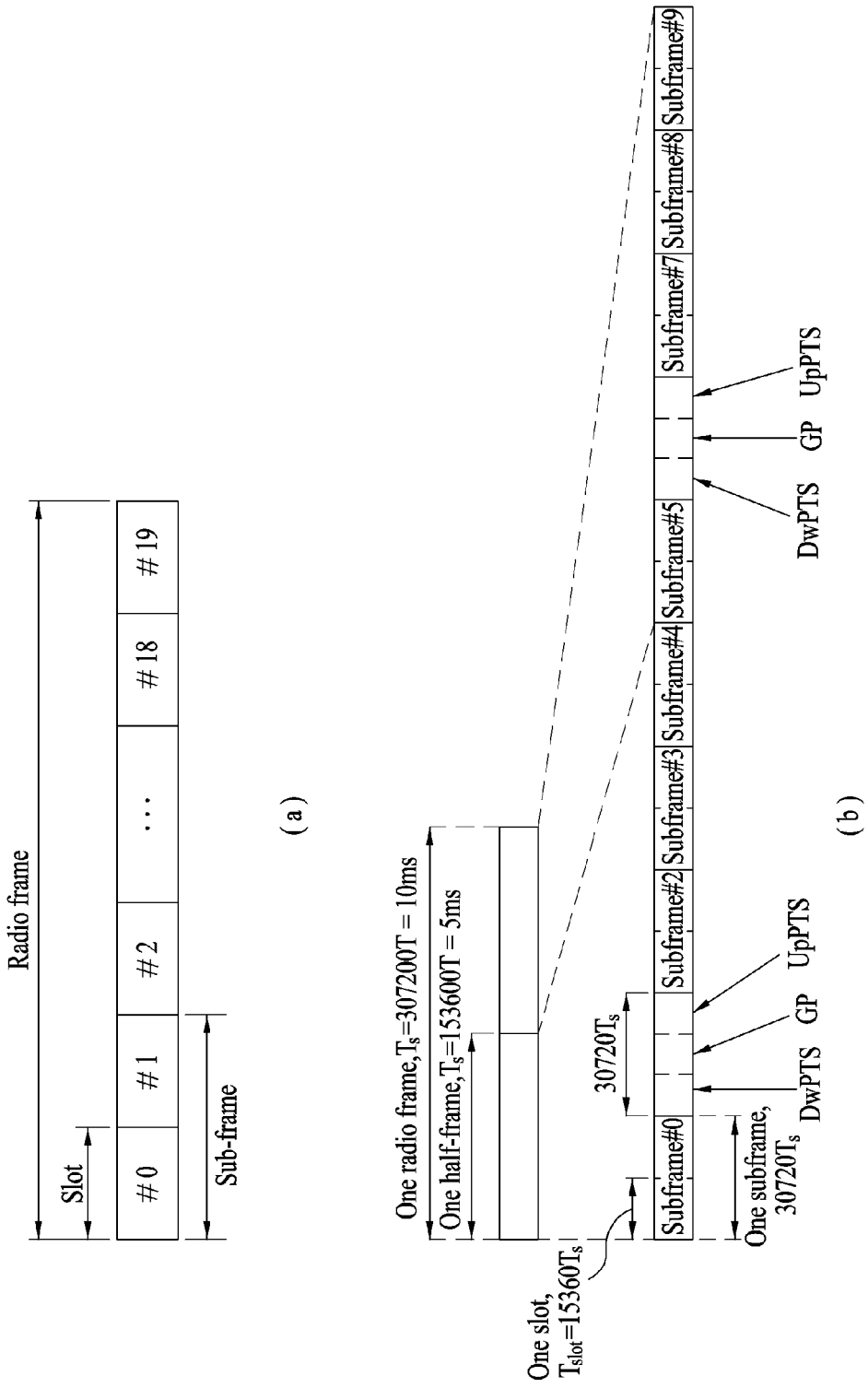
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
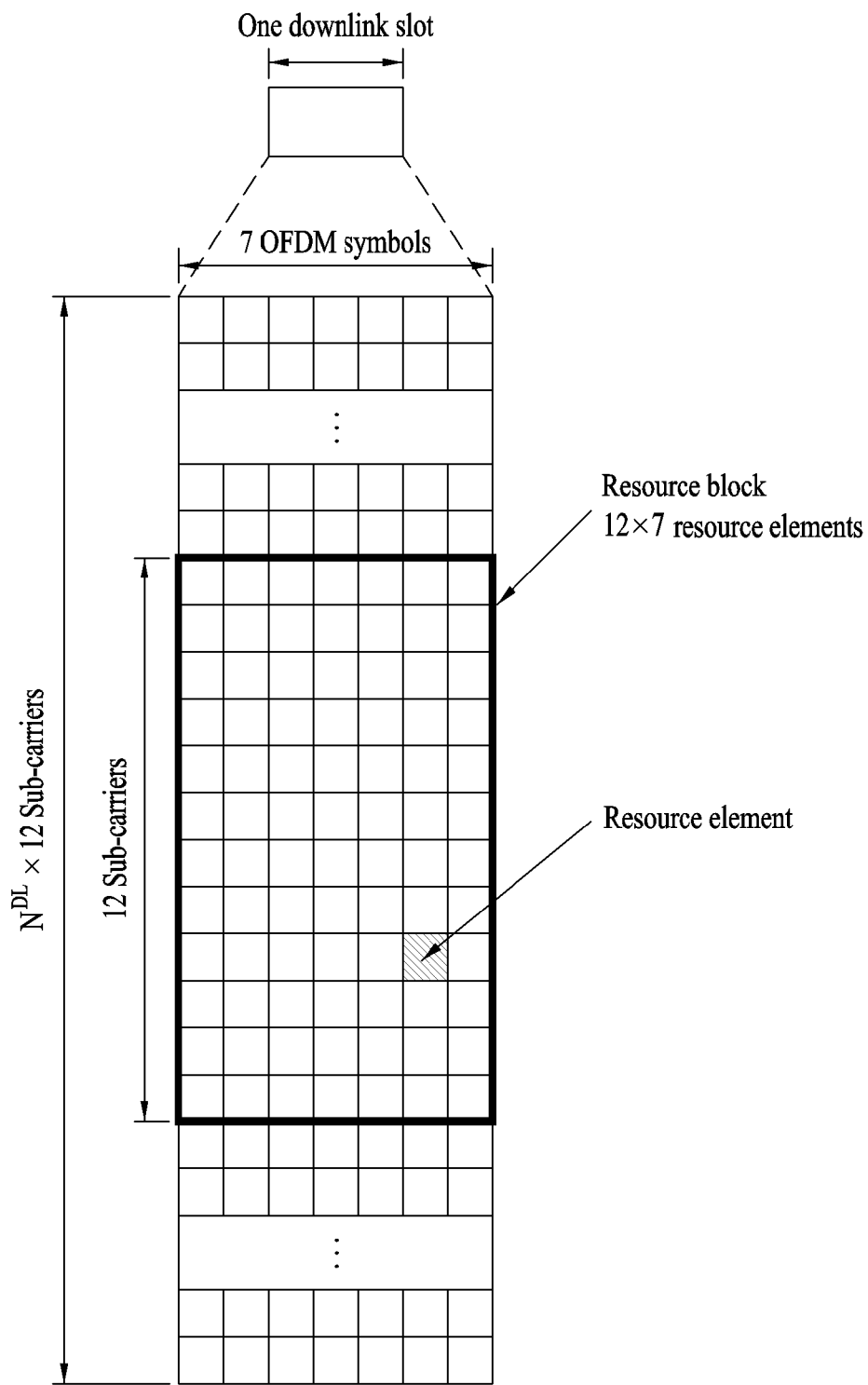
FIG. 2 is a diagram of a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
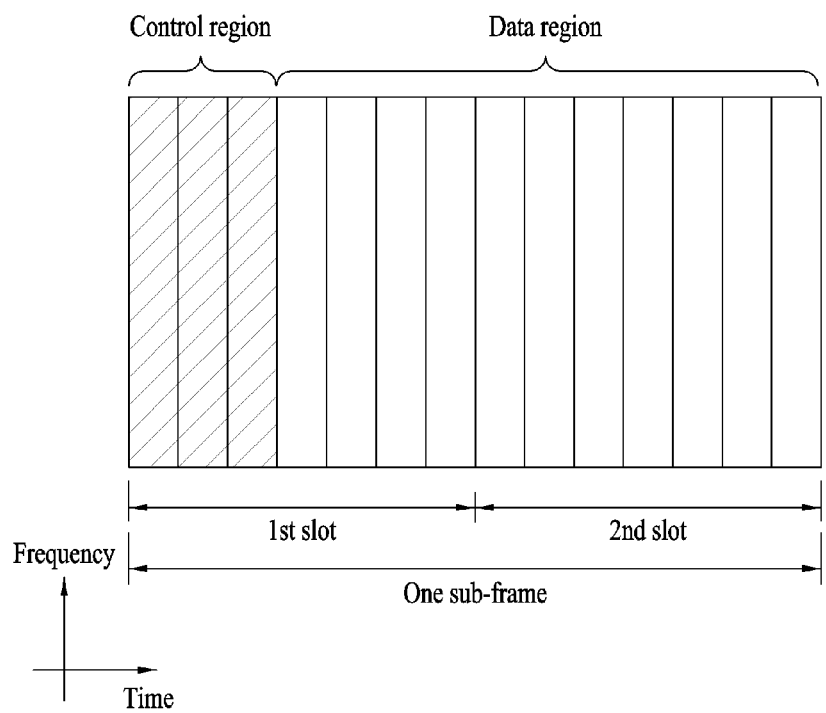
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
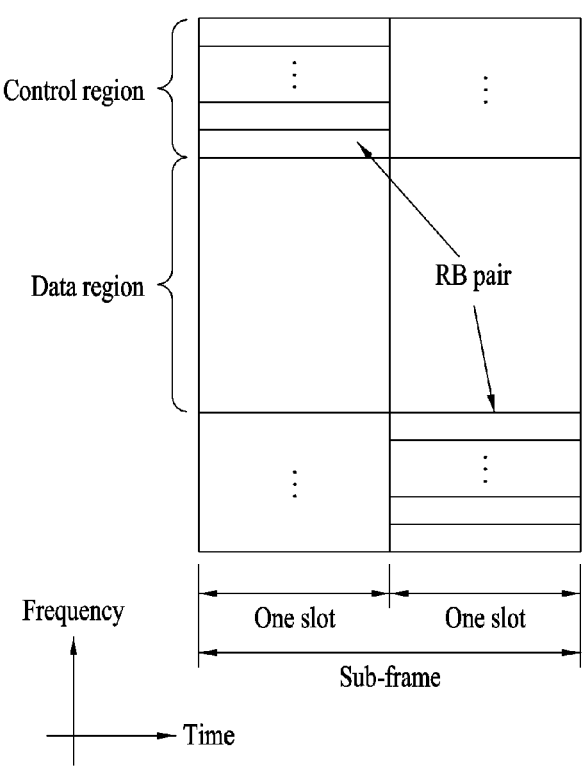
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

CRSs serve two purposes, that is, channel information acquisition and data demodulation. A UE-specific RS is used only for data demodulation. CRSs are transmitted in every subframe in a broad band and CRSs for up to four antenna ports are transmitted according to the number of Tx antennas in an eNB.

For example, if the eNB has two Tx antennas, CRSs for antenna ports 0 and 1 are transmitted. In the case of four Tx antennas, CRSs for antenna ports 0 to 3 are respectively transmitted.

FIG. 5 illustrates patterns in which CRSs and DRSs are mapped to a downlink RB pair, as defined in a legacy 3GPP LTE system (e.g. conforming to Release-8). An RS mapping unit, i.e. a downlink RB pair may include one subframe in time by 12 subcarriers in frequency. That is, an RB pair includes 14 OFDM symbols in time in the case of the normal CP (see FIG. 5(a)) and 12 OFDM symbols in time in the case of the extended CP (see FIG. 5(b)).

In FIG. 5, the positions of RSs in an RB pair for a system where an eNB supports four Tx antennas are illustrated. Reference numerals 0, 1, 2 and 3 denote the REs of CRSs for first to fourth antenna ports, antenna port 0 to antenna port 3, respectively, and reference character 'D' denotes the positions of DRSs.

Channel State Information-RS (CSI-RS)

CSI-RS is an RS used for channel measurement in an LTE-A system supporting up to eight antenna ports on downlink. CSI-RS differs in this aspect from CRS used for both channel measurement and data demodulation and thus it is not necessary to transmit CSI-RSs in every subframe like CRSs. CSI-RS is used in Transmission Mode 9. For data demodulation, DM-RS is used.

More specifically, CSI-RSs may be transmitted through 1, 2, 4 or 8 antenna ports. Antenna port 15 may be used for one antenna port, antenna ports 15 and 16 for two antenna ports, antenna ports 15 to 18 for four antenna ports, and antenna ports 15 to 22 for eight antenna ports.

CSI-RSs may be generated by the following [Equation 1].

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$

$$m = 0, 1, \ldots, N_{RB}^{max,DL} - 1$$

where $r_{l,n_s}(m)$ denotes the generated CSI-RSs, $c(i)$ denotes a pseudo-random sequence, $n_s$ is a slot number, l is an OFDM symbol index, and $N_{RB}^{max,DL}$ denotes the maximum number of RBs in a downlink bandwidth.

The CSI-RSs generated by [Equation 1] may be mapped to REs on a per-antenna port basis by the following equation.

$$a_{k,l}^{(p)} = w_{l''} \cdot r_{l,n_s}(m') \quad \text{[Equation 2]}$$

$$k = k' + 12m +
\begin{cases}
-0 & \text{for } p \in \{15, 16\}, \text{ normal cyclic prefix} \\
-6 & \text{for } p \in \{17, 18\}, \text{ normal cyclic prefix} \\
-1 & \text{for } p \in \{19, 20\}, \text{ normal cyclic prefix} \\
-7 & \text{for } p \in \{21, 22\}, \text{ normal cyclic prefix} \\
-0 & \text{for } p \in \{15, 16\}, \text{ extended cyclic prefix} \\
-3 & \text{for } p \in \{17, 18\}, \text{ extended cyclic prefix} \\
-6 & \text{for } p \in \{19, 20\}, \text{ extended cyclic prefix} \\
-9 & \text{for } p \in \{21, 22\}, \text{ extended cyclic prefix}
\end{cases}$$

$$l = l' +
\begin{cases}
l'' & \text{CSI reference signal configurations } 0-19, \text{ normal cyclic prefix} \\
2l'' & \text{CSI reference signal configurations } 20-31, \text{ normal cyclic prefix} \\
l'' & \text{CSI reference signal configurations } 0-27, \text{ normal cyclic prefix}
\end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

-continued $$m = 0, 1, \ldots, N_{RB}^{DL} - 1$$

$$m' = m + \left\lfloor \frac{N_{RB}^{max,DL} - N_{RB}^{DL}}{2} \right\rfloor$$

In [Equation 2], k' and l' may be determined according to CSI-RS configurations as illustrated in [Table 1].

TABLE 1

| | CSI RS Con- figu- ration | Number of CSI RSs configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame struc- ture type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame struc- ture type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Figure 6:
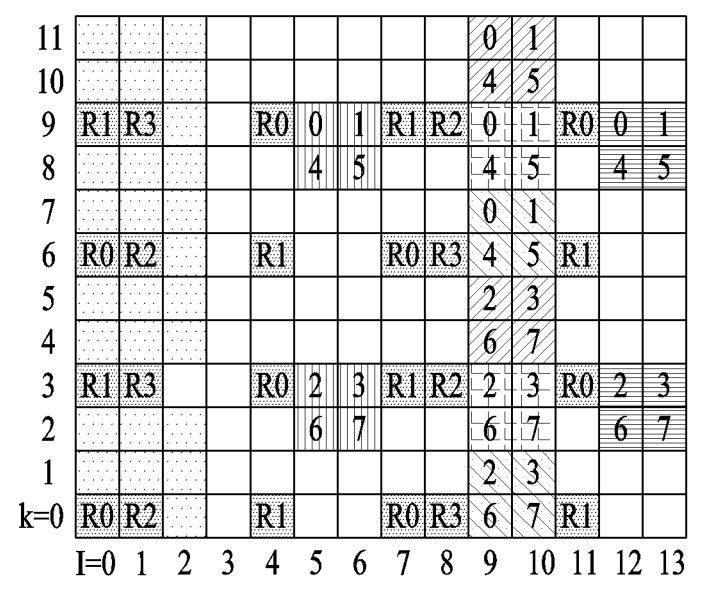

By Equation 2 and Table 1, a specific CSI-RS is mapped to an RE according to each antenna port. In FIG. 6, a CSI-RS is mapped with respect to each antenna port according to the above description. In FIG. 6, R0 to R3 represent mapping of CRSs for respective antenna ports and numbers denote mapping of CSI-RSs for respective antenna ports. For example, an RE denoted by number 0 or 1 indicates that a CSI-RS corresponding to antenna port 0 or 1 is mapped. In this case, CSI-RSs corresponding to two antenna ports are mapped to the same RE and this may be distinguished by different orthogonal codes.

As described above, the CSI-RSs may not be transmitted in every subframe but may be transmitted in a specific subframe. More specifically, the CSI-RSs may be transmitted in a subframe satisfying Equation 3 below by referring to a CSI-RS subframe configuration shown in Table 2.

TABLE 2

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ - 5 |
| 15-34 | 20 | $I_{CSI-RS}$ - 15 |
| 35-74 | 40 | $I_{CSI-RS}$ - 35 |
| 75-154 | 80 | $I_{CSI-RS}$ - 75 |

$$(10 n_f + \lfloor n_s/2 \rfloor - \Delta_{CSI-RS}) \bmod T_{CSI-RS} = 0 \quad \text{[Equation 3]}$$

where $T_{CSI-RS}$ denotes the transmission period of CSI-RSs, $\Delta_{CSI-RS}$ is an offset, $n_f$ is a system frame number, and $n_s$ is a slot number.

These CSI-RSs may be signaled to a UE in a CSI-RS configuration Information Element (IE) (CSI-RS-Config-r10) described in [Table 3] below.

TABLE 3

```
CSI-RS-Config-r10 ::=       SEQUENCE {
    csi-RS-r10              CHOICE {
        release             NULL,
        setup               SEQUENCE {
            antennaPortsCount-r10   ENUMERATED {an1, an2, an4,
an8},
            resourceConfig-r10      INTEGER (0..31),
            subframeConfig-r10      INTEGER (0..154),
            p-C-r10                 INTEGER (-8.. 15)
        }
    }
                            OPTIONAL,       -- Need ON
    zeroTxPowerCSI-RS-r10   CHOICE {
        release             NULL,
        setup               SEQUENCE {
            zeroTxPowerResourceConfigList-r10  BIT STRING (SIZE (16)),
            zeroTxPowerSubframeConfig-r10      INTEGER (0..154)
        }
    }
                            OPTIONAL        -- Need ON
}
```

In [Table 3], 'antennaPortsCount-r10' indicates the number of antennas through which CSI-RSs are transmitted (one of 1, 2, 4 and 8 is selected), and 'resourceConfig-r10' specifies REs carrying the CSI-RSs in one RB in the time-frequency domain. 'subframeConfig-r10' indicates a subframe carrying the CSI-RSs and the ratio of a CSI-RS Energy Per Resource Element (EPRE) to a PDSCH EPRE. In addition, the eNB transmits information about zero-power CSI-RSs.

In the CSI-RS Config IE, 'resourceConfig-r10' indicates the positions of the CSI-RSs. Specifically, 'resourceConfig-r10' indicates the positions of symbols and subcarriers carrying the CSI-RSs in one RB according to a CSI-RS configuration number ranging from 0 to 31 in [Table 1].

Channel State Information (CSI) Feedback

MIMO can be categorized into an open-loop scheme and a closed-loop scheme. The open-loop scheme performs MIMO transmission at a transmitter without feedback of CSI from a MIMO receiver, whereas the closed-loop scheme performs MIMO transmission at the transmitter using feedback of CSI from the MIMO receiver. In closed-loop MIMO, each of the transmitter and the receiver may perform beamforming based on CSI to obtain multiplexing gain of MIMO transmit antennas. The transmitter (e.g., eNB) may allocate an uplink control channel or an uplink shared channel to the receiver (e.g., UE) such that the receiver may feed back CSI.

CSI fed back may include a Rank Indicator (RI), a Precoding Matrix Index (PMI), and a Channel Quality Indictor (CQI).

The RI indicates information about a channel rank. The channel rank represents a maximum number of layers (or streams) through which different pieces of information may be transmitted through the same time-frequency resource. The RI is mainly determined by long term fading of a channel and, thus, the RI may be fed back at a longer period relative to the PMI and CQI.

The PMI is information about a precoding matrix used for transmission from the transmitter and is a value in which spatial characteristics of a channel are reflected. Precoding refers to mapping a transport layer to a transmit antenna. A layer-to-antenna mapping relation may be determined by a precoding matrix. The PMI indicates a precoding matrix index of an eNB preferred by a UE based on a metric such as Signal-to-Interference plus Noise Ratio (SINR). To reduce feedback overhead of precoding information, the transmitter and receiver may share a codebook including various precoding matrices and only an index indicating a specific precoding matrix in the codebook may be fed back.

In a system supporting an extended antenna configuration (e.g., LTE-A system), acquisition of additional multi-user diversity using Multi-User MIMO (MU-MIMO) is considered. When an eNB performs downlink transmission using CSI fed back by one of multiple UEs, it is necessary to prevent downlink transmission from interfering with other UEs since an interference channel is present between UEs multiplexed in the antenna domain in MU-MIMO. Accordingly, in order to correctly perform MU-MIMO operation, more accurate CSI feedback than Single User MIMO (SU-MIMO) needs to be fed back.

A new CSI feedback scheme that improves CSI composed of the RI, PMI, and CQI may be applied in order to measure and report more accurate CSI. For example, precoding information fed back by the receiver may be indicated by a combination of two PMIs. One (first PMI) of the two PMIs has long term and/or wideband attributes and may be referred to as W1. The other PMI (second PMI) of the two PMIs has short term and/or subband attributes and may be referred to as W2. A final PMI may be determined by a combination (or function) of W1 and W2. For example, if the final PMI is W, W may be defined as W=W1*W2 or W=W2*W1.

The CQI is information indicating channel quality or channel strength. The CQI may be represented by an index corresponding to a combination of predetermined MCSs. That is, a feedback CQI index may indicate a modulation scheme and a code rate. Generally, the CQI is a value reflecting a reception SNR capable of being obtained when the eNB configures a spatial channel using the PMI.

The CSI feedback scheme is divided into periodic reporting through a PUCCH, which is an uplink control channel, and aperiodic reporting through a PUSCH, which is an uplink data channel, performed at the request of an eNB.

CSI Reference Resource

In the current LTE/LTE-A, CSI reference resource related to channel measurement for the above-mentioned CSI feedback/report is defined. The CSI reference resource is defined as a group of physical RBs corresponding to a frequency band associated with the calculated CQI in frequency domain. In addition, the CSI reference resource is defined as $n-n_{CQI\_ref}$ in time domain. Here, the n indicates a subframe for CSI transmission/report and the $n_{CQI\_ref}$ corresponds to i) in the case of periodic CSI reporting, a smallest value corresponding to a valid subframe among values equal to or greater than 4, ii) in the case of non-periodic CSI reporting, a valid subframe corresponding to the subframe in which a CSI request in a uplink DCI format is transmitted, or iii) 4 in case of a CSI request of a random access response grant in the non-periodic CSI reporting. In this case, a valid subframe means the subframe that meets one of the following conditions. Firstly, it should be a downlink subframe for a corresponding user equipment. Secondly, it should not be an MBSFN subframe except in the case of transmission mode 9. Thirdly, in case of TDD, DwPTS should have a length equal to or greater than a prescribed length. Fourthly, it should not be included in a measurement gap configured for a corresponding user equipment. Lastly, in the case of the periodic CSI reporting, if a user equipment is configured with a CSI subframe set, it should correspond to one of elements in the CSI subframe set. The CSI subframe sets ($C_{CSI,0}$, $C_{CSI,1}$) are configured for the corresponding user equipment by a high layer. In the current standards, it is defined that the CSI reference resource are included in one of the two CSI subframe sets ($C_{CSI,0}$, $C_{CSI,1}$) but cannot be included in both of the two sets.

Measurement/Measurement Report

A measurement report is used for one or more of various techniques (handover, random access, cell search, etc.) designed to ensure mobility of UEs. Since the measurement report needs a certain degree of coherent demodulation, UE may perform measurement after acquiring synchronization and physical layer parameters, except for measurement of a received signal strength. The measurement report covers radio resource management (RRM) measurement such as reference signal receive power (RSRP), received signal strength indicator (RSSI) and reference signal received quality (RSRQ) measurement, which are measurements of signal strengths or signal strengths to total reception power of a serving cell and neighbor cells, and radio link monitoring (RLM) measurement, which measures a quality of a link with a serving cell to determine whether radio link failure has occurred.

Regarding the RRM, RSRP is a linear average of power distribution of RE for CRS transmission in downlink. RSSI is a linear average of receive power received by a user equipment. An OFDM symbol including RS for antenna port 0 is measured for RSSI. RSSI is a measured value including interferences from neighbor cells and noise power. If a specific subframe is indicated for RSRQ measurement through a higher layer signaling, t RSSI is measured for all the OFDM symbols included in the specific subframe. RSRQ is a values measured in the format of N*RSRP/RSSI, where N is the number of RBs in a corresponding bandwidth at the time of RSSI measurement.

The purpose of RLM is to enable UE to monitor a downlink quality of its serving cell and to determine 'in-sync' or 'out-of-sync' for the corresponding cell. In this case, RLM is performed based on CRS. The downlink quality estimated by UE is compared with 'in-synch threshold (Qin)' and 'out-of-sync threshold (Qout)'. These thresholds are represented as PDCCH block error rate (BLER) of a serving cell. In particular, Qout and Qin are set to values corresponding to 10% BLER and 2% BLER, respectively. In reality, Qin and Qout have values corresponding to SINR of received CRS. If SINR of received CRS is equal to or higher than a certain level (Qin), UE determines to remain attached to a corresponding cell. If SINR of received CRS is equal to or lower than a certain level (Qout), UE declares radio link failure (RLF).

As can be seen from the above-mentioned RSRP definition, it is basically assumed that measurement reporting is performed using CRS. However, in case that cells share the same PCID, the cells having the same PCID cannot be distinguished from each other based on the CRS. Accordingly, RRM cannot be performed for each of the cells using the measurement report including RSRP/RSRQ based on the CRS only. Therefore, if the cells share the same PCID, RSRP/RSRQ measurement reporting may be additionally performed based on CSI-RSs which are individually transmitted. To increase reception accuracy in receiving CSI-RS of a specific cell, neighbor cells do not perform signal transmission in RE in which the CSI-RS is transmitted. Thus, measurement may be more accurately performed even though a frequency of CSI-RS transmission is lower than in the case of CRS. Therefore, by performing CRS-based RSRP/RSRQ measurement reporting and CSI-RS RSRP/RSRQ measurement reporting together regardless of whether or not the cells have different PCIDs, accuracy of RRM for a network may be enhanced.

Another purpose of CSI-RS transmission in each cell is for UE to perform CSI feedback in order to assist scheduling of a base station that determines a rank, a precoding matrix, and a modulation and coding scheme (MCS) (or CQI), which may be used in DL data transmission between a cell and the UE. According to a CoMP transmission scheme, a user equipment should feed back CSI even for downlink with a cooperative cell other than a serving cell. If CSI for all the cells contained in a CoMP cluster to which the serving cell of the UE belongs are fed back, an excessive amount of overhead occurs. Therefore, the UE may be configured to feed back CSI only for some cells contained in the CoMP cluster, i.e., a CoMP measurement set that is worth coordinated scheduling and coordinated data transmission. To determine a CoMP measurement set for a specific user equipment, it may be configured by selecting cells having RSRP of a predetermined level or higher. To this end, the user equipment performs RSRP measurement reporting on the cells contained in the CoMP cluster to which the corresponding user belongs. Alternatively, the base station may designate configurations of the CSI-RSs, for which the UE needs to perform RSRP or RSRQ measurement, as a CoMP management set and inform the user equipment of the designated configurations. Then, the UE may perform RSRP or RSRQ measurement for the CSI-RSs transmitted from the cells belonging to the designated CoMP management set. If the result of measurement meets a specific condition, the UE may perform reporting.

Additionally, in order to enable ICIC between CoMP clusters, the UE performs RSRP measurement and reporting for the cells in a neighbor CoMP cluster such that the network and the UE identify a cell in the neighbor CoMP cluster that applies strong interference to the UE and a cell to which the UE applies strong UL interference.

Along with CRS based RSRP/RSRQ measurement reporting for mobility management such as handover of UE, CSI-RS based RSRP/RSRQ measurement reporting may be performed for configurations of the CoMP measurement set and ICIC. Therefore, accuracy and flexibility of RRM for the network may be enhanced.

Uplink Power Control

In the LTE/LTE-A system, uplink power control is applied in order to perform demodulation on uplink control information, data and the like smoothly. The uplink power control may be classified into PUCCH power control, PUSCH power control, uplink SRS (sounding reference signal) power control.

The PUCCH power control is determined in consideration of pathloss, maximum transmit power of UE and the like in order to perform demodulation on control information transmitted on PUCCH with sufficiently low error rate.

Particularly, PUCCH power control of subframe i in cell c can be determined by Formula 4 in the following.

$$P_{PUCCH}(i) = \min\begin{Bmatrix} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{Bmatrix} [dBm] \qquad \text{[Formula 4]}$$

In Formula 4, $P_{CMAX,c}(i)$ indicates maximum transmit power of a user equipment and corresponds to an upper limit on PUCCH power control commands.

$P_{O\_PUCCH}$ is a PUCCH transmit power value which a base station desires to receive. This value is transmitted as a UE-specific parameter through high layer signaling and determined by the sum of nominal power value of $P_{O\_NOMINAL\_PUCCH}$ and $P_{O\_UE\_PUCCH}$.

$PL_c$ is a value of pathloss in the cell c and is estimated by a user equipment. In particular, the user equipment may estimate this value by measuring reception power of DL CRS (cell-specific reference signal).

$h(n_{CQI}, n_{HARQ}, n_{SR})$ is a value that depends on a PUCCH format. $n_{CQI}$ indicates the number of bits for representing channel quality information and $n_{HARQ}$ indicates the number of HARQ bits. If the subframe i is configured for a scheduling request, $n_{SR}$ is set to 1. Otherwise, it is set to 0.

$h(n_{CQI},n_{HARQ},n_{SR})$ depends on the PUCCH format. Particularly, it may be set to i) 0 in case of PUCCH format 1, 1a or 1b, ii)

$$\frac{(n_{HARQ}-1)}{2}$$

in case of using at least one serving cell in the PUCCH format 1b, or iii) $10 \log_{10}$ $$\left(\frac{n_{CQI}}{4}\right)$$

in case of using a normal cyclic prefix in PUCCH format 2, 2a, or 2b.

$\Delta_{F\_PUCCH}(F)$ is a value signaled by a high layer in consideration of MCS. This value reflects that if necessary, the number of bits per subframe and an error rate require different SINRs (signal to noise interference ratio) according to PUCCH formats.

$\Delta_{TxD}(F')$ is power offset signaled by the high layer in case of transmitting PUCCH using two antenna ports and depends on the PUCCH format.

$g(i)$ is an accumulation value of the current PUCCH power control adjustment state and is determined by a power value of $\delta_{PUCCH}$ corresponding to a transmit power control command field value included in a DCI format transmitted on PDCCH and $g(i-1)$ corresponding to a PUCCH power control adjustment state value of a previous subframe.

In case that PUCCH transmission is not accompanied, PUSCH power control can be determined by Formula 4 in the following.

$$P_{PUSCH,c}(i) = \min\left\{\begin{array}{c} P_{CMAX,c}(i), \\ 10\log_{10}(M_{PUSCH,c}(i)) + P_{O\_PUSCH,c}(j) + \alpha_c(j) \cdot \\ PL_c + \Delta_{TF,c}(i) + f_c(i) \end{array}\right\} [dBm] \quad \text{[Formula 5]}$$

In Formula 5, $P_{CMAX,c}(i)$ indicates maximum transmit power of a user equipment and $M_{PUSCH,c}(i)$ indicates PUSCH transmission bandwidth expressed as the number of RBs.

$P_{O\_PUSCH,c}(j)$ is a PUCCH transmit power value which a base station desires to receive. This value is determined by the sum of nominal power value of $P_{O\_NOMINAL\_PUCCH}$ and $P_{O\_UE\_PUCCH}$. It is determined as j=0 in case of semi-persistent scheduling, j=1 in case of dynamic scheduling, and j=2 in case of a random access response.

$\alpha_c(j) \cdot PL_c$ indicates DL pathloss, where $PL_c$ is a value estimated by a user equipment and $\alpha_c(j)$ is a pathloss compensation value transmitted through high layer signaling. If j is set to 0 or 1, $\alpha_c \in \{0, 0.4, 0.5, 0.6, 0.7, 0.8, 0.9, 1\}$ and if j is set to 1, $\alpha_c(j)=1$.

$\Delta_{TF,c}(i)$ indicates a value calculated using a value transmitted through high layer signaling, BPRE (bit per resource element, and bits of CQI and PMI, and the like.

$f_c(i)$ indicates an accumulation value and is determined by a power value corresponding to a TPC (transmit power control) command field value contained in a DCI format transmitted on PDCCH, $K_{PUSCH}$ corresponding to a value depending on configurations such as FDD, TDD, etc., and $f_c(i-1)$ corresponding to a value accumulated until a previous subframe.

If PUCCH transmission is accompanied with PUSCH transmission, PUSCH power control can be determined by Formula 6 in the following.

$$P_{PUSCH,c}(j) = \min\left\{\begin{array}{c} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot \\ PL_c + \Delta_{TF,c}(i) + f_c(i) \end{array}\right\} [dBm] \quad \text{[Formula 6]}$$

In Formula 6, $\hat{P}_{CMAX,c}(i)$ is a linear value with respect to $P_{CMAX,c}(i)$ and $\hat{P}_{PUCCH}(i)$ is a linear value with respect to PUCCH power control determined by Formula 6. The rest of parameters are the same as in the foregoing description.

Enhanced Interference Management and Traffic Adaptation (eIMTA)

In case of TDD, each subframe (except a special subframe for switching between UL and DL) are pre-configured to be used for either uplink or downlink. Referring to Table 4 below, in case of UL-DL configuration 0, subframes #0 and #5 in one radio frame may be pre-configured to be used for downlink, and subframes #2, #3, #4, #7, #8 and #9 may be pre-configured to be used for UL, for example. UL-DL configuration to be used by a specific base station may be provided to a user equipment as part of system information (e.g., SIB 1). In addition, neighbor base stations are forced to use the same TDD configuration, i.e., the same UL-DL configuration for a reason such as interference.

TABLE 4

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 4, D denotes a subframe for DL transmission, U denotes a subframe for UL transmission, and S denotes a special subframe.

In case that a system operates according to the UL-DL configurations shown in Table 4, if the amount of data transmitted in UL or DL rapidly increases, in order to increase efficiency, at least one subframe configured as a UL subframe may be changed into and used as a DL subframe, or at least one subframe configured as a DL subframe may be changed/switched into and used as a UL subframe.

The use of the UL subframe as the DL subframe by switching the UL subframe into the DL subframe may be allowed only in underline subframes shown in Table 5 below. Also, Table 6 shows a case of allowing a switching period to be changed. Moreover, in case that the switching period cannot be changed, subframes that can be changed into and used as DL subframes are represented as underlined.

TABLE 5

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 6

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In addition, the switching of the UL subframe into the DL subframe may be configured so as to meet the conventional TDD configuration. In other words, if usage of a subframe is dynamically changed, TDD UL-DL configuration resulting from the change should corresponds to one of TDD UL-DL configurations in Table 4. Particularly, for example, if subframe #4 is switched into the DL subframe in the case of the UL-DL configuration 0, subframe #9 needs to be switched into the DL subframe at the same time. Also, in this case, it has an advantage in that a presence or non-presence of the change in the UL-DL configuration may be informed using 1 bit.

Determination of Measurement Set

Based on the above-mentioned description a method for a user equipment to perform measurement in various interference situations according to embodiments of the present invention is explained. In the following description, the term 'measurement' is used as a broad concept that includes signal measurement using the above-mentioned RRM, RLM and CSI-RS, interference measurement using CSI-IM resource, and the like unless mentioned especially.

According to a measurement method in one embodiment of the present invention, a user equipment receives UL-DL configurations of different transmission points (TPs) from a $1^{st}$ transmission point and may then determine at least one measurement set based on the received UL-DL configurations. In this case, the different transmission points may be transmission points neighboring the $1^{st}$ transmission point and the $1^{st}$ transmission point may be a serving cell of the user equipment. Moreover, UL-DL configuration may be signaled as system information by each cell or configured for eIMTA (i.e., the UL-DL configuration may relate to a usage change from a UL subframe into a DL subframe and vice versa).

Figure 7:
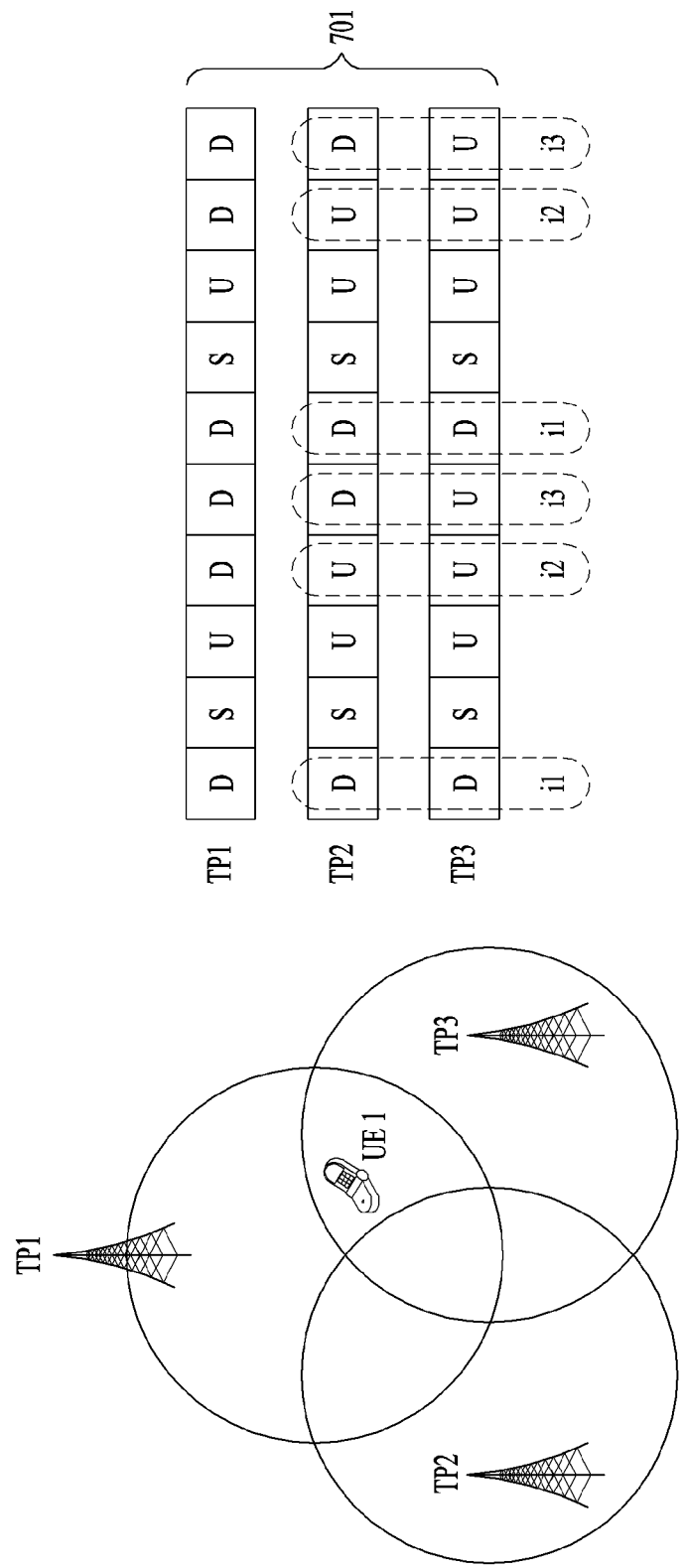
FIGS. 7 to 11 are diagrams to describe embodiments of the present invention.

Assuming a case that there are 2 different TPs (i.e., a $2^{nd}$ TP and a $3^{rd}$ TP), when determining at least one or more measurement sets, a user equipment may receive a UL-DL configuration related to each of the $2^{nd}$ TP and the $3^{rd}$ TP from the $1^{st}$ TP. In particular, the user equipment is able to determine at least one or more measurement sets based on such information. In this case, each of the one or more measurement sets may be composed of subframes with the same combination of a duplex direction in a specific time interval in accordance with the UL-DL configuration related the $2^{nd}$ TP and a duplex direction in the specific time interval in accordance with the UL-DL configuration related the $3^{rd}$ TP. Details are described with reference to FIG. 7. FIG. 7 illustrates a $1^{st}$ transmission point (TP1) corresponding to a serving cell of a user equipment, $2^{nd}$ transmission point (TP2) and $3^{rd}$ transmission point (TP3) neighboring the $1^{st}$ transmission point, and UL-DL configurations 701 of the three transmission points, each of which corresponds to 1 radio frame. If the user equipment receives UL-DL configurations of the $2^{nd}$ and $3^{rd}$ TPs from the $1^{st}$ TP, the user equipment can be aware of a combination of a duplex direction in accordance with the UL-DL configuration of the $2^{nd}$ TP and a duplex direction in accordance with the UL-DL configuration of the $3^{rd}$ TP and then use subframes having the same combination as one measurement set. In the example in FIG. 7, three combinations of D-D(i1), U-U(i2) and D-U(i3) can be made and the three combination of D-D(i1), U-U(i2) and D-U(i3) corresponds to a $1^{st}$ measurement set, a $2^{nd}$ measurement set and a $3^{rd}$ measurement set, respectively. In this case, since each of D-D(i1), U-U(i2) and D-U(i3) indicates a different interference situation, the generation of 3 measurement sets with respect to the above three combinations means that measurement for all of the different interference situations can be performed. In particular, according to the above embodiment, the user equipment may measure interference in a manner of combining subframes (or IMR) having the same interference characteristic.

Figure 8:
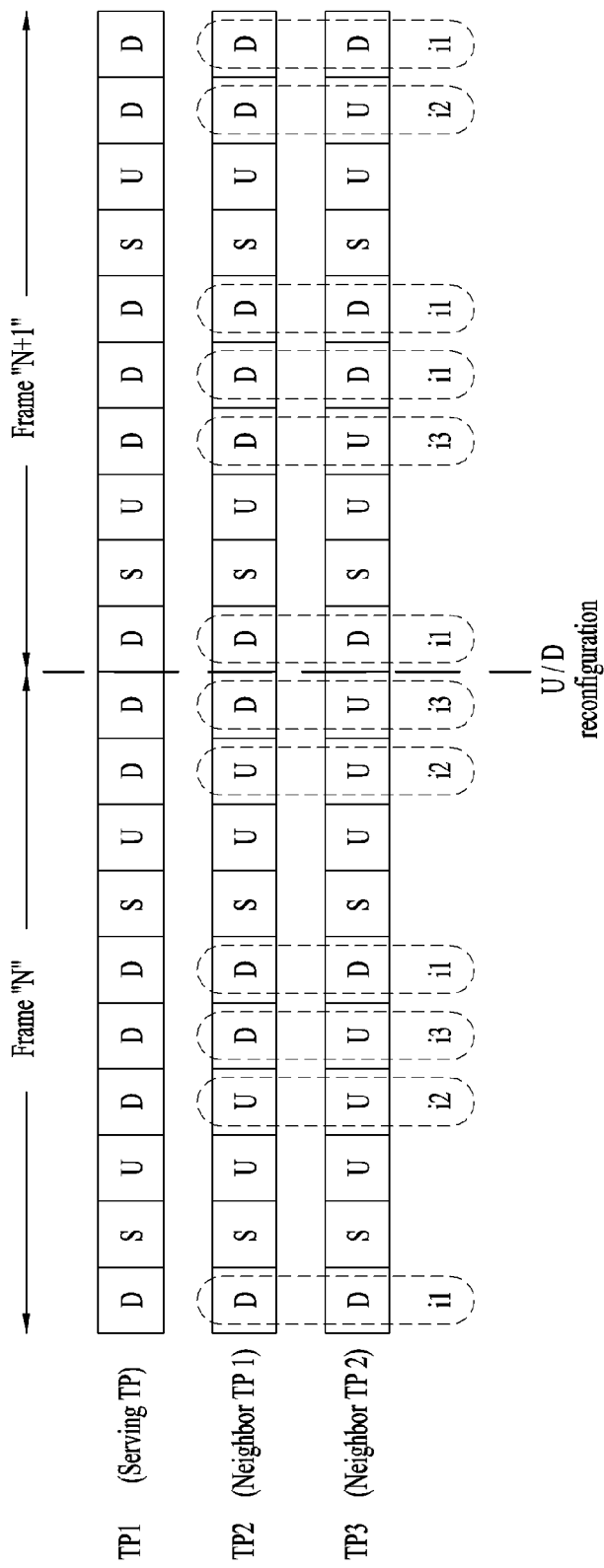

In addition, the user equipment may calculate an average value of measurement results of subframes included in a measurement window based on an interference set generated according to the embodiment. In this case, the measurement window may be signaled by a base station or be autonomously configured by the corresponding user equipment. Moreover, even if UL-DL configurations within the measurement window are reconfigured, an average value of measurement results can be calculated. More particularly, FIG. 8 illustrates a case that a reconfiguration of UL-DL configurations occurs in a measurement window having a size of two frames. In FIG. 8, the reconfiguration may be performed due to a change in system information or for eIMTA. Although such the reconfiguration occurs, a user equipment may generate a measurement set based on a combination of duplex directions in accordance with respective UL-DL configurations. Therefore, an interference set can be configured using subframes having the same interference characteristic despite of the reconfiguration of the UL-DL configurations, whereby measurement results can be averaged. In particular, in FIG. 8, measurement results of subframes #0 and #5 having interference characteristic of D-D in frame N and subframes #0, #4, #5 and #9 having interference characteristic of D-D in frame (N+1), which appears after the reconfiguration, can be averaged. An operation of averaging regardless of reconfiguration may be performed on a static subframe of a serving cell (or a subframe of which usage is not changed in the case of eIMTA) only. Moreover, an interference average may be calculated on each subframe designated by the serving cell and neighbor cells in common Regarding this, a base station may signal whether independent interference measurement can be performed on the static subframe and/or a flexible subframe (i.e., a subframe of which usage is changed or to be changed in eIMTA) or whether all flexible subframes can be assumed to have the same interference characteristic. If specific flexible subframes have different interference characteristics from each other, a subframe set may be signaled so as to perform limited measurement within flexible subframe set.

If an interference measurement set is assigned, a combination of subframe sets on which interference average can be calculated may be signaled (e.g., it may be signaled that interference measurement set 0 before reconfiguration and interference measurement set 1 after reconfiguration can be averaged). Alternatively, indices of interference measurement sets composed of subframes having the same interference characteristic may be configured equal to each other. In particular, although the subframe composition of the interference measurement sets before reconfiguration is different from that after the reconfiguration, measurement results between the interference measurement sets having the same index may be averaged.

Additional Subdivision of Interference Situation

According to the above-mentioned embodiment, a measurement set is mainly determined based on UL-DL configurations of neighbor cells. However, in eIMTA environment, it is necessary to subdivide interference situations. The reason for this is that subframes included in a single measurement set may have different interference characteristics depending on whether each of the subframes corresponds to a static subframe or a flexible subframe. Thus, a measurement set is (further) subdivided according to a subframe property (i.e., whether a subframe corresponds to a static subframe or a flexible subframe) or transmit power. Moreover, this may mean that a measurement (subframe) set is determined by a combination of high (or higher) layer explicit signaling and physical (PHY) layer implicit signaling (if it is assumed that multiple configuration sets are signaled by PHY signaling).

Figure 9:
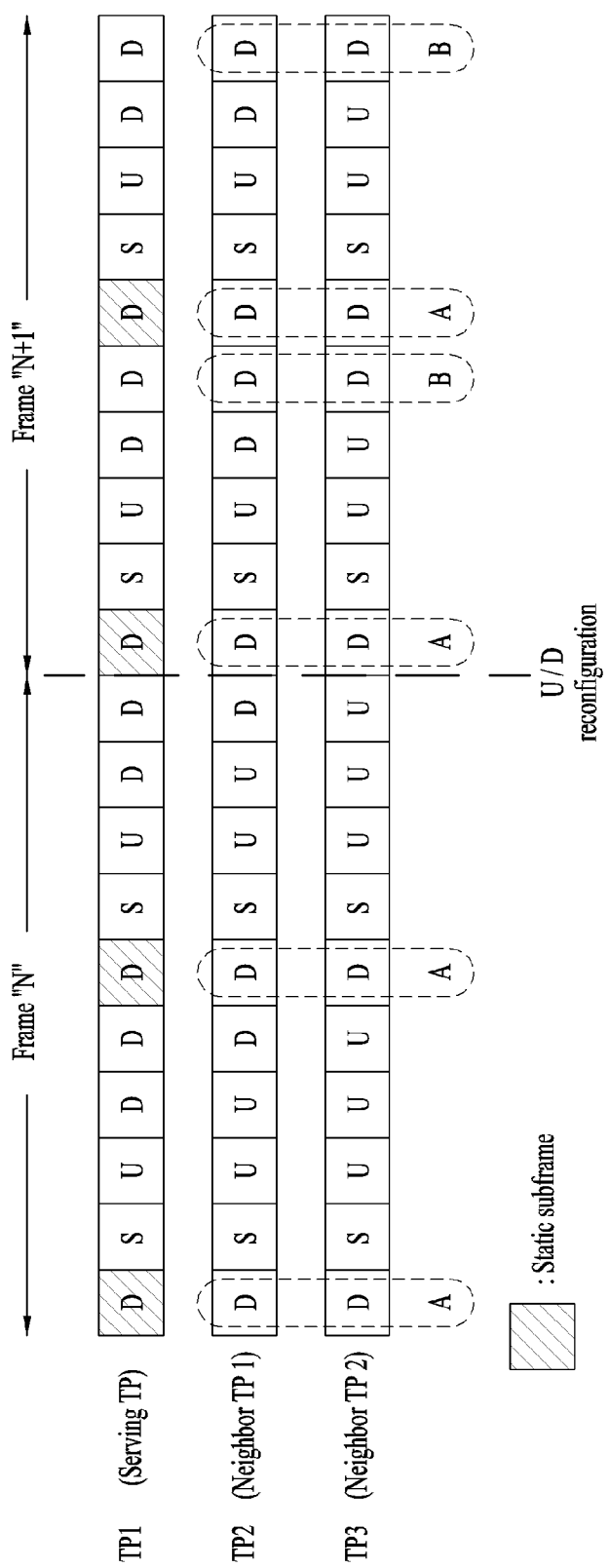

FIG. 9 shows an example of subdivision of a measurement set. Referring to FIG. 9, set A and set B may be determined as one measurement set by signaling of UL-DL configurations and generation/determination of a measurement set based on the signaling as mentioned in the foregoing description. However, in the case of the measurement set B, a corresponding subframe is the flexible subframe, whereby there is a change in transmit power (i.e., compared to the case of the static subframe, small transmit power is used in the case of the flexible subframe due to interference). Therefore, set A and set B may be subdivided into different measurement sets. Such subdivision of a measurement set may be implemented with restricted measurement. For instance, if subframes represented as static subframes in FIG. 9 are signaled as a restricted measurement set, a user equipment may perform measurement by subdividing a subframe set composed of subframes configured as DL subframes in all of its serving cell, neighbor cell 1 and neighbor 2 into a subframe set corresponding to the restricted subframe set (i.e., subframes marked as A) and a subframe set corresponding to the restricted subframe set (i.e., subframes marked as B).

Reduction of Measurement Set

According to the above-mentioned embodiment, as the number of neighbor transmission points increase, interference characteristics also increase significantly. The number of measurement sets that can be handled by a user equipment may be different depending on capability of the corresponding user. Moreover, since a user equipment may handle interference differently depending on whether the user equipment is located at a cell boundary or close to the center of a cell, a measurement set may be changed as well.

In consideration of the above situations, grouping may be applied to a measurement set. In particular, among one or more measurement sets, measurement sets corresponding to a combination of specific duplex directions may be grouped. In this case, the combination of the specific duplex directions may be informed by a serving cell. For instance, if there are 2 neighbor cells corresponding to dominant interference, maximum 4 interference characteristics (e.g., UU, UD, DU, and DD) exist. However, the interference characteristics may be grouped into interference measurement set 1 with respect to DD (i.e., in case that all of the 2 neighbor cells perform DL transmission) and interference measurement set 2 with respect to UU, UD, and DU by a base station. If a user equipment receives corresponding signaling, the user equipment averages subframe sets or IMR corresponding to the 2 interference characteristics and may then measure interference for each of the interference characteristics. Such grouping may be determined based on measurement results of the user equipment and the base station may demand the user equipment to report the measurement result of each of the interference measurement sets. For instance, if there are 2 neighbor cells corresponding to dominant interference, the base station may demand the user equipment to perform measurement (e.g., RSRQ, RSSI, RSRP, etc.) for each of combinations of duplex directions, i.e., (D,D), (D,U), (U,D) and (U,U) of the corresponding neighbor cells. And, if a corresponding combination does not match a DL subframe of the serving cell, measurement for the neighbor cells may be performed in a UL subframe of the serving cell (alternatively, without additional UE measurement, interference grouping may be performed based on the measurement for the neighbor cells reported by the user equipment). Moreover, if the neighbor cells correspond to UL subframes, the user equipment may perform measurement using an IMR configuration or in a manner of being informed of SRS configuration. According to measurement results of a user equipment, an interference environment preferred by each user equipment can be determined or an interference environment that can be excluded by each user equipment (or, an interference environment that does not schedule the corresponding user equipment) can be selected. Such signaling may be instructed through UE-specific or cell-specific signaling. If an interference measurement set is determined based on UE's capability or based on a location of each user equipment (calculated based on a RSRQ report, etc.) in case of a large cell, the UE-specific signaling may be preferable. On the other hand, if most user equipments are significantly affected by interference due to a small size of a cell, the cell-specific signaling may be preferable.

Figure 10:
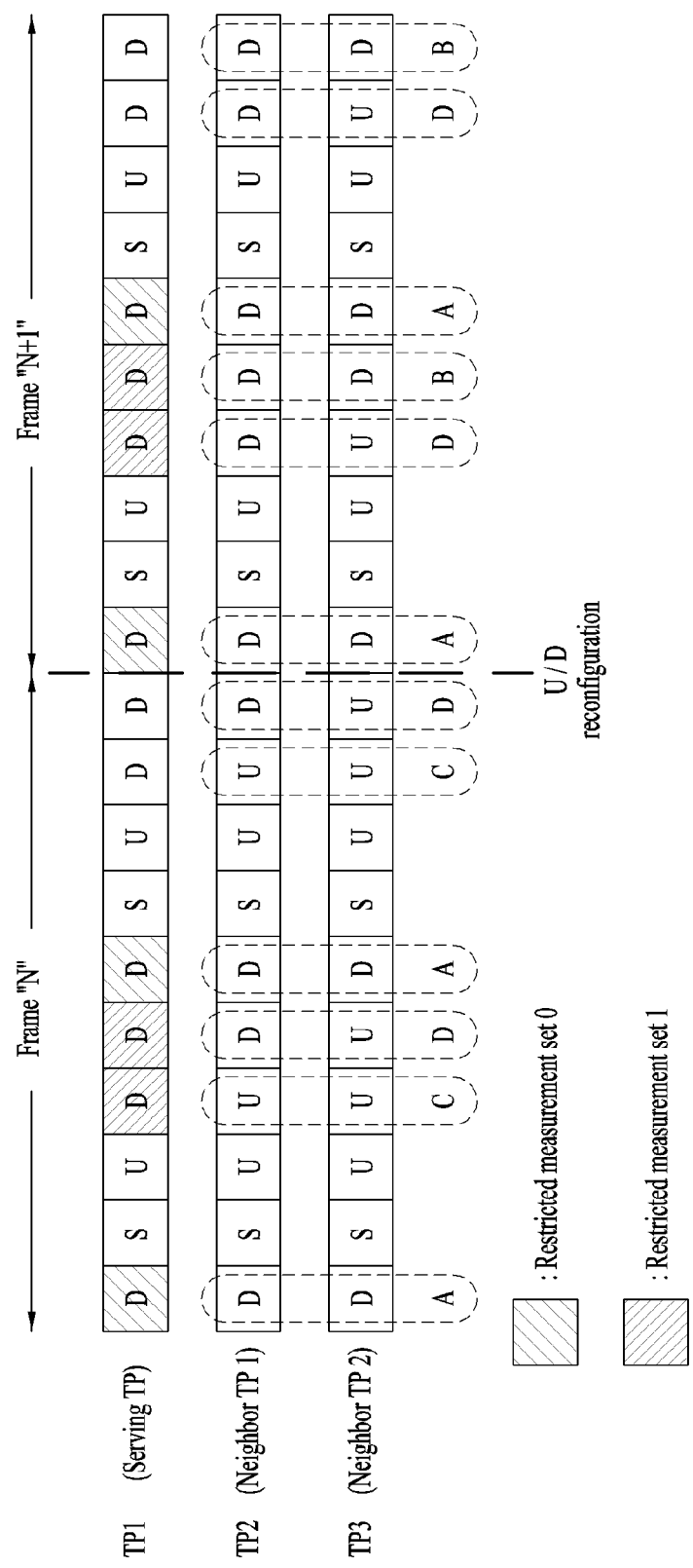

If measurement sets are calculated based on restricted measurement and combinations of UL-DL configurations, too many measurement sets may be present. In this case, the number of measurement sets to be used for actual measurement may be reduced according to priority of measurement sets. The number of the measurement sets to be used for the actual measurement may be determined by UE's capability or through signaling (e.g., higher layer signaling or physical layer signaling). And, the priority may be determined though higher layer signaling or physical layer signaling. For instance, a base station previously informs a user equipment of priority/combinations of such elements for determining measurement sets as UL-DL configurations, restricted measurement sets, IMR configuration, etc. (through high layer signaling or the like) and may then inform additional combinations to be used for the user equipment to actually determine the measurement sets. FIG. 10 illustrates an example to describe the above-mentioned case. In FIG. 10, it is assumed that measurement sets (i.e., restricted measurement sets 0 and 1) signaled by a base station and a plurality of UL-DL configurations are used to determine measurement sets. As a first example, which can be applied to the situation in FIG. 10, a base station may signal in order for a user equipment to perform measurement based on restricted measurement sets. In the drawing, the user equipment may consider subframes #0 and #5 in frame N and subframes #0 and #5 in frame (N+1) as one measurement set and subframes #3 and #4 in the frame N and subframes #3 and #4 in the frame (N+1) as another measurement set. Alternatively, the base station may signal in order for the user equipment to measure 4 measurement sets. In this case, the user equipment may perform measurement in a manner of sorting measurement sets into measurement set 0 including subframes #0 and #5 of the frame N and subframes #0 and #5 of the frame (N+1), measurement set 1 including subframe #3 of the frame N, measurement set 2 including subframe #4 of the frame N and subframe #3 of the frame (N+1), and measurement set 3 including subframe #4 of the frame (N+1), based on the restricted measurement sets and a plurality of the UL-DL configurations. Moreover, the base station may signal priority of measurement sets as in order of A→D→C→B. And, the user equipment, which can have only two measurement sets, may perform measurement in a manner of setting the subframes #0 and #5 of the frame N and the subframes #0 and #5 of the frame (N+1) as the measurement set 0, and the subframe #4 of the frame N and the subframe #3 of the frame (N+1) as the measurement set 1. As a second example, the base station may signal in order for the user equipment to sort measurement sets based on a plurality of UL-DL configurations and additionally determine and signal priority as in order of A (static DL, static DL)→D (DL, UL)→C (UL, UL)→B (flexible DL, flexible DL). Having received the corresponding information, the user equipment may measure only a specific set(s) among measurement set A, B, C and D in accordance with its capability and then report. As a third example, the base station may instruct the user equipment to perform measurement only in a specific interference situation. For instance, the base station may instruct the user equipment to measure only an interference environment consisting of measurement set 0 (static DL, static DL) and measurement set 0 (flexible DL, flexible DL). And, the base station may additionally signal restricted measurement sets and then instruct the user equipment to perform only subframe sets overlapping between the signaled restricted measurement sets and the above measurement sets 0 and 1. In particular, the base station may set subframes overlapping between the restricted measurement sets and the measurement set 0 as measurement set A and subframes overlapping between the restricted measurement sets and the measurement set 1 as measurement set B and then signal to perform measurement for the measurement sets A and B.

In the above-mentioned cases, if the number of measurement sets increases according to 'additional subdivision of interference situation', a user equipment can assume that an interference characteristic in a flexible DL subframe is identical to that in a flexible UL subframe. Alternatively, a serving cell may signal whether the user equipment can consider the interference characteristic in the flexible DL subframe to be identical to that in the flexible UL subframe. For instance, if the number of neighbor transmission points (or dominant interferers) is 2, 9 different interference characteristics may appear due to configuration combinations of the corresponding neighbor TPs. In particular, (if assuming that a UL subframe is not changed into a DL subframe) interference characteristics may be subdivided into (SD, SD), (SD, FD), (SD, U), (FD, SD), (FD, FD), (FD, U), (U, SD), (U, FD), and (U, U). If the above assumption is applied, FD and U may be considered as the same interference characteristic, whereby they are sorted into 4 interference characteristics (e.g., (SD, SD), (SD, FD), (FD, SD), (FD, FD)). In addition, the base station may prioritize TPs operating as dominant interferers and then sort interference characteristics based on a subframe type of TP with high priority. For example, a user equipment may perform measurement only for two interference characteristics of (static DL) and (flexible DL and UL) in configurations of a specific transmission points of two interference source transmission points. In this case, the user equipment does not need to consider duplex directions of another interference source transmission point. This method may be applied to implicit/explicit measurement inducement/deduction proposed in the present invention.

Determination of Measurement Set Using Index

Generation/determination of a measurement set using a combination of UL-DL configuration indices of a serving cell and a neighbor cell is described. Particularly, in each combination of UL-DL configuration indices of a serving transmission point and a neighbor transmission point operating as a dominant interferer, a measurement set to be used in a corresponding combination may be defined. In this case, a plurality of (measurement set) candidates, which can become the measurement set, may be previously informed through high layer signaling or the like. Also, it may be previously informed that which candidate (may include at least one measurement set) for each configuration combination should be used. After having received corresponding signaling, if a user equipment may receive configuration indices of the serving TP and the neighbor TP through a dynamic reconfiguration message, the user equipment may determine the measurement set in accordance with the combination of the UL-DL configuration indices of the TPs.

In order to stably operate the above-mentioned method of determining the measurement set using the indices in a situation of a reconfiguration of UL-DL configurations, each transmission point may inform the user equipment of a linkage between a measurement set before the reconfiguration and a measurement set after the reconfiguration as well as the reconfiguration message. Thus, the user equipment may average measurement results of measurement sets connected through the linkage despite of occurrence of the reconfiguration. Alternatively, TP may set measurement set indices for UL-DL configuration combinations with the same interference characteristic as the same value.

If the number of transmission points operating as dominant interferers are increased or changed, it may increase complexity of the method of determining the measurement set using the indices. Thus, in order to prevent this, the serving transmission point may designate transmission points operating as the dominant interferers and then signal such information for measurement as measurement set candidates and the like in consideration of UL-DL configurations of the transmission points. In particular, the number of neighbor transmission points that need to be considered in measurement may vary in each transmission point. And, a measurement set type, the number of measurement set, and the like may be set different in each transmission point depending on the number of the neighbor transmission points. The user equipment may determine the measurement set based on configurations of the corresponding neighbor transmission points irrespective of signal strength of the neighbor transmission point designated by the serving transmission point (i.e., regardless of whether signal strength of a transmission point designate as the neighbor transmission point is weak). In this case, each serving transmission point may designate neighbor transmission points in a cell deployment step (i.e., performing measurement for neighbor cells and then using corresponding measurement results).

Determination of the measurement set using the indices may be performed in the same manner as in the following example.

A user equipment performs measurement for neighbor cells by periods (or in accordance with signaling of a serving transmission point) and may then report a neighbor transmission point having a strongest signal strength (or a prescribed number X of transmission points counting from the transmission point with the strongest signal strength, which is required by the serving transmission point) to the serving transmission point. Based on the corresponding report, the serving transmission point may inform the user equipment of new configuration information of a serving cell and configuration information of the cell reported by the user equipment. Based on configurations of the serving transmission point and the neighbor transmission point forwarded from the serving transmission point, the user equipment may determine measurement (subframe) sets. In this case, the subframe sets may be sorted in each (DL) subframe according to an interference characteristic of the corresponding neighbor transmission point. Alternatively, measurement sets may be implicitly sorted according to a predefined subframe set(s) (or defined through high layer signaling or the like of the serving transmission point) per configuration index combination of the serving cell and the neighbor transmission point. Grouping may be applied to the above measurement sets. For instance, two measurement sets may be configured in a manner of distinguishing between a case that neighbor cell corresponds to static DL and a case that neighbor cell does not correspond to static DL by the serving transmission point (or in accordance with a predefined definition). Moreover, additional signaling may be introduced to distinguish a static subframe and a flexible subframe. For instance, a reference UL-DL configuration is previously defined as configuration 0 or a UL-DL configuration on SIB1 of the neighbor transmission point or the reference UL-DL configuration may be signaled by the serving transmission point. The user equipment may calculate static and flexible subframes in a manner of comparing the reference UL-DL configuration and new configuration of the neighbor cell. Alternatively, a static subframe (and/or flexible frame) pattern may be signaled by the serving transmission point. In the present invention, information may be provided to the user equipment by the serving transmission point through physical layer signaling or high layer signaling.

As another example, in order to reduce complexity in performing a restricted measurement, the number of dominant interferers (i.e., neighbor cells that operate dominant interferers to a corresponding user equipment or a corresponding cell) and the number of restricted measurement sets may be determined. Moreover, the number of the dominant interferers and the number of the restricted measurement sets may be defined as specific values X and Y, respectively (for example, the number of the dominant interferers=1 and the number of the measurement (subframe) sets=2) or they are signaled to the user equipment through high layer signaling or the like. In addition, the serving transmission point makes a request of measurement results to the user equipment (for instance, the serving transmission point may demand the corresponding user equipment to select a neighbor cell operating as the dominant interferer (through measurement for the neighbor cells) and to report the selected neighbor cell) and then checks/confirms the corresponding report. Through the above process, the prescribed number of the dominant interferers may be determined between the serving transmission point and the user equipment. Alternatively, the serving transmission point may determine the dominant interferer based on measurement results of the neighbor cells previously reported by the user equipment and then signal the determined dominant interferer. (The serving transmission point may determine a cell operating as the dominant interferer to the corresponding cell in a cell-specific manner and then signal the cell operating as the dominant interferer to each user equipment. In this case, all user equipments in the corresponding cell can assume the same dominant interference.) In case of CoMP, a CSI process may be defined in each of transmission points. Since transmission point may be affected by different dominant interferers, respectively, the number of the dominant interferers and the number of the measurement (subframe) sets mentioned in the foregoing description may be defined in each CSI process.

The serving transmission point may signal UL-DL reconfiguration information on a multitude of neighbor cells in a cell-specific manner (or UE-specific manner). In this case, the user equipment performs the restricted measurement in a manner of considering only a UL-DL configuration of the neighbor cell operating as the dominant interferer among UL-DL configurations of a multitude of the neighbor cells, which are signaled from the serving transmission point. Alternatively, the serving transmission point may signal only UL-DL configuration information of the dominant interferers reported by a specific user equipment (or determined by a base station based on a previous measurement report of the corresponding user equipment).

Moreover, the serving transmission point may previously inform each user equipment of a measurement (subframe) set per UL-DL configuration index of the dominant interferer. Alternatively, a measurement (subframe) set per combination of a reference UL-DL configuration index (e.g., UL-DL configuration on SIB that is recognized as UL-DL configuration by a legacy user equipment or UL-DL configuration in which a presence or non-presence of static/flexible can be determined) of the dominant interferer and a new UL-DL configuration index may be previously informed. The above measurement (subframe) set per configuration index (or per combination of the reference configuration index and the new configuration index) may include a predetermined number (e.g., 2) of subframe sets.

After the dominant interferer is determined, the user equipment can be aware of the UL-DL configuration of the corresponding dominant interferer based on the signaling from the serving transmission point. Thereafter, the user equipment may measure interference using the specific number (e.g., 2) of the measurement sets defined in each predefined UL-DL configuration index or defined in each UL-DL configuration index previously signaled by the transmission point. In addition, it may be assumed that among measurement subframes belonging to each measurement (subframe) set, subframes corresponding to DL subframe locations in UL-DL configuration of the current serving transmission point are valid as actual measurement subframes. In particular, the user equipment may determine a final measurement (subframe) set through a logical AND operation of each measurement (subframe) set defined according to the UL-DL configuration index of the dominant interferer and DL subframes in the UL-DL configuration of the serving transmission point. Moreover, if the DL subframes of the serving transmission point have different transmit power like high power DL and low power DL (or static DL and flexible DL), in the case of the above-mentioned measurement (subframe) set, one measurement (subframe) set may be divided into two subsets according to transmit power of the serving transmission point. In this case, the divided subsets may be used for signal measurement. And, in case of interference measurement, the measurement (subframe) set may be used or measurement may be performed on each of the subsets. (For instance, in case that one measurement (subframe) set exist, the corresponding measurement (subframe) set may be divided into subset 0 and subset 1 according to transmit power of the serving transmission point. Signal measurement may be performed by a unit of subset and interference measurement may be performed by a unit of subframe set). This may be signaled by the serving transmission point and defined in advance.

If UL subframes and DL subframes of a neighbor transmission point are defined as the measurement (subframe) set, the above-proposed signaling on the measurement (subframe) set per configuration index can be omitted. If the user equipment receives the UL-DL configuration of the dominant interferer from the base station, the user equipment may perform the restricted measurement for DL subframes in the serving cell in a manner of generating a subframe set composed of UL subframes in the dominant interferer and a subframe set composed of DL subframes in the dominant interferer. On the other hand, if the neighbor transmission point performs DL power control in order to reduce interference between base stations, each subframe set may be divided into a static DL subframe set and a flexible DL/UL subframe set. In this case, the user equipment may use a measurement (subframe) set linked to a configuration index (or an index combination) of the neighbor transmission point as proposed in the foregoing description. Furthermore, if each transmission point determines whether to perform DL power control or it may be determined according to a specific rule, the serving transmission point may inform the user equipment of whether (DL)/(UL) subframe set is used or (static DL)/(flexible DL & UL) subframe set is used.

Measurement Set and Transmit Power

As mentioned in the foregoing description, the phenomenon that an interference characteristic varies in each subframe due to a UL-DL configuration (or a dynamic reconfiguration) of a neighbor cell may occur in a UL subframe of a serving cell as well. Therefore, uplink power control can be also performed on each interference characteristic. Referring to the aforementioned embodiment, in case that a subframe included in each measurement set is used for uplink transmission in a $1^{st}$ transmission point, uplink transmit power may be independently determined in each measurement set.

Figure 11:
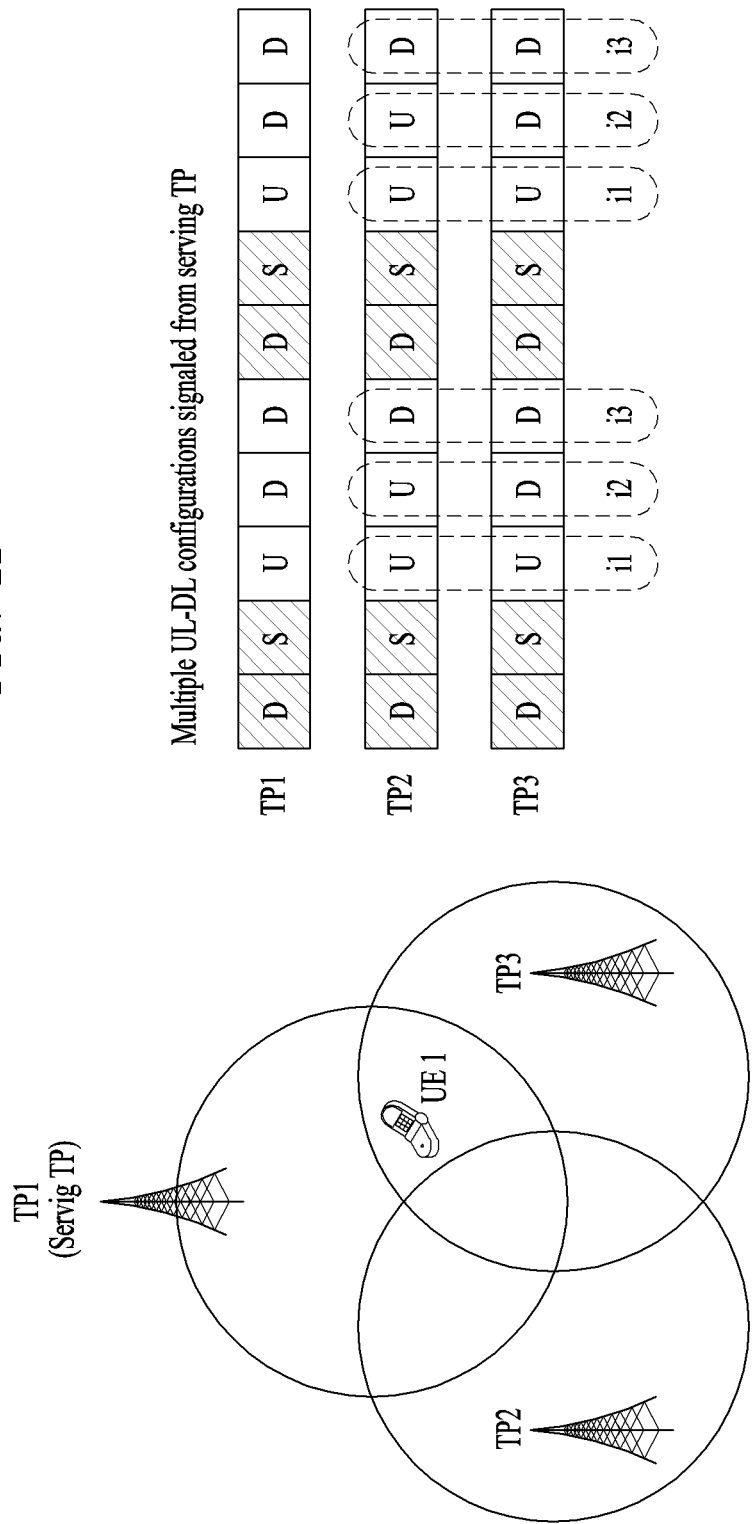

FIG. 11 shows such an example. Referring to FIG. 11, a user equipment (UE 1) receives UL-DL configurations of a $2^{nd}$ transmission point and a $3^{rd}$ transmission point and may perform grouping of interference characteristics on its UL subframe (within a serving cell) based on the received UL-DL configurations. In this case, there are 3 interference characteristics and they are may be grouped into i1 (UL-UL), i2 (UL-DL), and i3 (UL-UL) according to duplex directions of the $2^{nd}$ TP and the $3^{rd}$ TP. And, UL power control may be independently performed on a subframe set corresponding to each of the interference characteristics. For instance, subframes are sorted as follows. Subframes #2 and #7 are included in set 1, subframes #3 and #8 are included in set 2, and subframes #4 and 9 are included in set 3. The power control may be independently performed on each of the sets. In this case, independent performance of the power control means that each of the sets may have an independent basic open-loop operating point as a parameter for open-loop power control (e.g., PO_PUSCH, PO_PUCCH, PO_SRS, αC, etc.) and a TPC command should be applied to each of the sets. A TPC mode (e.g., accumulative TPC command/absolute TPC command) may be designated for each of the sets. For the above-mentioned independent power control for each of the sets, a serving TP may designate a specific parameter set for each of the interference characteristics and then inform a user equipment of the specific parameter set through high layer signaling. The user equipment may apply a parameter set matching the interference characteristic of each of the sets on which the user equipment performs grouping to a corresponding set. Moreover, the serving TP may signal in order for UE to consider a plurality of interference characteristics as a single interference characteristic. The TPC command may be independently performed on each of the sets. For instance, in the case of the accumulative TPC command, a corresponding TPC command may be applied with reference to a previous power level of a subframe set including a UL subframe to which TPC of DL (or UL) grant is applied. For instance, in FIG. 11, +1 dB of the accumulative TPC command is applied to the subframe #9, the user equipment may perform UL transmission on the previous subframe #4 in the same subframe set in a manner of adding 1 dB to UL transmit power. Likewise, in the case of the absolute TPC command, corresponding TPC may apply to the basic open-loop operating point indicated through high layer signaling for the subframe set including the TPC applied UL subframe (or for interference characteristic of the subframe set to which the UL subframe belongs). For instance, in FIG. 11, if reference transmit power of A dBm, B dBm and C dBm are defined in subframe sets of set1, set2 and set3 respectively through high layer signaling, the user equipment may set transmit power in the subframe #9 to (C+4) dBm in accordance with +4 dBm of the absolute TPC command in the subframe #9 (if the same TPC command is applied to the subframe #8, (B+4) dBm of transmit power may be set).

Moreover, the serving TP signals to the user equipment a subframe set per interference characteristic calculated through cooperation with neighbor TP and a transmit power parameter per subframe set. And, the serving TP may previously define or inform the user equipment through high layer signaling that the TPC command is also applied to each subframe set.

As another method, a base station sets a multitude of UL PC parameter sets (e.g., UL power control set 0, UL power control set 1, UL power control set 2 and UL power control set 3) and may dynamically inform through high layer signaling which set includes the UL subframe to which the TPC command included UL (or DL) grant is applied. In this case, an open-loop parameter and the like can be included in each UL power control parameter set. Having received the TPC command through the UL (or DL) grant, a user equipment may be aware of which UL power control set includes the UL subframe to which the corresponding TPC command is applied and then perform power control in accordance with the TPC command based on the corresponding UL power control set. For instance, when the user equipment receives the TPC command through UL grant and is then aware that the corresponding TPC command is included in UL power control set 0, the user equipment may apply the accumulative TPC command based on transmit power of the most recent UL subframe included in the UL power control set 0 among subframes before the UL subframe to which the corresponding UL grant is applied. Similarly, the absolute TPC command may be applied based on reference transmit power of the UL power control set 0 (reference transmit power may be determined by the open-loop parameter and the like in each UL power control set).

Hereinafter, additional features applicable to the above-mentioned embodiments will be described.

The above-mentioned embodiments may be applied to IMR configuration introduced for CoMP and the like. For instance, in case that a network sets IMR for subframes #3 and #9 in each radio frame, there are 3 interference characteristics ("U, U", "D, U", "D, D") in one IMR configuration due to DL-UL configurations of neighbor transmission points. Thus, if CSI and the like are measured using the corresponding IMR, a user equipment may generate 3 CSI for the same CSI-RS configuration (i.e., CSI-RS configuration for signal measurement) in accordance with 3 interference characteristics in the same IMR configuration. And, the user equipment may average by considering all interference characteristics included in a corresponding CSI process as the same interference characteristic according to predefinition or network signaling or may perform interference measurement for each interference and CSI measurement. Alternatively, it may be previously defined or signaled by a base station that the user equipment performs measurement for only a specific interference characteristic among a multitude of interference characteristics that may appear in the same IMR configuration (for example, it may be previously defined or signaled that regarding all IMR configurations, interference measurement for subframes which are configured as "DL subframes" by all neighbor TPs is valid only).

In addition, a multitude of measurement sets are also used for signal measurement. For instance, if neighbor cells intend to use UL subframes as DL subframes, a corresponding base station may use a method for reducing DL transmit power for corresponding subframes (set) in order to reduce BS-to-BS interference to the neighbor cells. Therefore, signal measurement may be also performed in a manner of sorting subframes into a subframe set using normal DL transmit power (or non-zero power CSI-RS configuration) and a subframe set using reduced DL transmit power. Alternatively, in the same CSI-RS configuration, it may be sorted into normal power and reduced power and the sorting may be determined in accordance with difference between a current UL-DL configuration and a reference UL-DL configuration (e.g., UL-DL configuration on SIB). For instance, UL subframe in h the reference configuration is changed into a DL subframe, it may be defined that the base station may perform DL transmission using the reduced power in order to reduce the BS-to-BS interference. And, if UL subframe in the reference configuration is used as DL subframe in the current UL-DL configuration, a user equipment may perform the signal measurement in a manner of distinguishing the corresponding subframe form DL subframe in both of the reference configuration and the current UL-DL configuration.

For the above-mentioned signal measurement and interference measurement, additional information with respect to the existing non-zero power CSI-RS configuration, IMR configuration, CSI process and the like may be signaled. For instance, while the definition of each of the configurations is maintained, it may introduce a subset concept for each of the configurations. For instance, in the case of the existing CSI-RS configuration, one CSI-RS configuration may be divided into two types depending on whether a subframe in which corresponding CSI-RS is transmitted corresponds to a static subframe or a flexible subframe. The IMR configuration may be also divided into a multitude of subsets depending on a subframe in corresponding IMR is located (i.e., depending on an interference characteristic affecting a corresponding subframe). And, in the case of the IMR, the subsets may be determined according to duplex directions of neighbor cells (or a multitude of UL-DL configurations signaled by a base station) instead of subframe types of a serving cell. Accordingly, the CSI process configured with the CSI-RS configuration and the IMR configuration may be also composed of a multitude of subsets (or a multitude of the subset may be set for a user equipment in a manner of designating each of the subsets as the CSI process). For instance, in case that N of UL-DL configurations (except a configuration of the serving cell) are signaled by the base station, one CSI process may be divided into (2N+1 (=2* 2N)) of subsets. And, the number of the subsets may be limited by the base station. For example, it may be instructed to consider a multitude of interference characteristics as the same interference characteristic according to the above-mentioned interference grouping or to measure and report only CSI based on a specific interference characteristic and signal characteristic. As another method, a representative subset is selected for each CSI process and then signaled to a user equipment. And, the user equipment may perform reporting of a representative subset of a corresponding CSI process at a time for performing reporting of the corresponding CSI process.

In addition, in preparation for the case that a user equipment fails in performing U/D reconfiguration accurately, it is proposed that the user equipment perform measurement for only a default configuration if a reconfiguration message corresponds to NACK or the user equipment fails in receiving the corresponding message at a timing of transmission of the reconfiguration message. In this case, the default configuration may be previously defined as static DL of a serving cell (or corresponding CSI-RS configuration) and/or static DL of a neighbor cell (or corresponding IMR configuration). Alternatively, the default configuration may be also defined as a combination of static DL of the serving cell and a static subframe (static DL & static UL) of the neighbor cell, a combination of static DL of the serving cell and static UL of the neighbor cell, or any combinations thereof. As another method, a signal measurement set and an interference measurement set (or default CSI process) corresponding to the default configuration may be informed the user equipment through high layer signaling or the like (in this case, the measurement set may be the above-mentioned subframe set (or CSI process) or a subset that considers even an interference characteristic).

RRM/RLM measurement can be also determined by a multitude of UL-DL configurations signaled by a base station without additional measurement set signaling. For instance, it may be previously defined that a user equipment performs the RRM/RLM measurement for a subframe set including both a static subframe of a serving cell and a static subframe of a neighbor cell. Alternatively, if a specific user equipment intends to perform scheduling on a specific configuration (i.e., a specific interference characteristic (e.g., a case that all neighbor cells correspond to DL subframes) and/or a specific signal characteristic (e.g., a case that the serving cell corresponds to a static DL subframe)), the corresponding user equipment may be informed of corresponding information (e.g., configuration(s) of a specific neighbor cell and/or a specific subframe type of the serving cell) through high layer signaling or the like. In this case, the user equipment may perform RRM measurement and/or RLM measurement using subframes matching the subframe type of the serving cell and/or the interference characteristic (e.g., a combination of duplex directions of a neighbor cell) signaled by the base station irrespective of a presence or non-presence of a reconfiguration. Since a measurement set is defined in accordance with the signal and/or the interference characteristic without frequent updates for an RRM/RLM measurement set in an environment in which UL-DL configurations of the serving cell and neighbor cells are dynamically changed, it has advantages in that signaling overhead can be reduced and that more stable measurement results can be obtained.

The CSI estimated according to the present invention can be reported to a base station through a periodic reporting scheme or a non-periodic reporting scheme. According to the related art, in the case of CSI reporting, measurement results of a subframe set or a resource set for a CSI process or the like are reported depending on a transmission mode. The above-mentioned embodiments can be applied to the CSI reporting scheme in three manners as follows. Firstly, in case that CSI, which needs to be reported, is determined in accordance with a subframe set to which a reference resource belongs, according to the present invention, the CSI may be generated using interference measured in a subframe set having the same characteristic as a combination of duplex directions of a neighbor cell that affects the subframe set to which the reference resource belongs. Secondly, in case that CSI needs to be reported based on a CSI process, all of the CSI on each interference characteristic (and/or signal characteristic) measured in the corresponding CSI process is reported. Alternatively, through high layer signaling or the like, the base station indicates a certain interference characteristic (and/or signal characteristic) in each CSI process to be reported and instructs a user equipment to report CSI on the indicated interference characteristic (e.g., a representative duplex direction combination (D(serving)-D(neighbor 1)-D(neighbor 2))). And, if the user equipment receives a request for reporting CSI on a specific CSI process, the user equipment may report CSI on a specific signal and/or interference combination in the corresponding CSI process based on signaling. Thirdly, in case that it is applied to CA and/or CoMP and non-periodic CSI reporting is activated, CSI on a certain duplex combination in each CSI process of respective CCs (and/or TPs) to be reported in each DL subframe may be pre-defined or indicated through high layer signaling. And, CSI assigned to a DL subframe that receives UL grant, in which CQI request is activated, may be reported.

Furthermore, if multiple UL-DL configurations are not signaled to a user equipment, a base station (or transmission point) may explicitly inform a user equipment of a measurement set to be used. As a first method, the base station previously signals a multitude of measurement sets and may instruct the user equipment to use a specific measurement set when signaling a U/D reconfiguration. In this case, a measurement window can be defined as from a reconfiguration timing to next reconfiguration timing. For instance, the base station may define a multitude of measurement (subframe) sets in a manner of distinguishing between interference characteristics according to UL-DL configuration combinations of neighbor cells and then inform the user equipment of a multitude of the measurement (subframe) sets. And, the base station may instruct the user equipment to perform measurement based on new measurement (subframe) sets in a manner of informing the user equipment of indices of measurement (subframe) sets matching the UL-DL configuration combinations of the neighbor cells (obtained through cooperation with the neighbor cells) at an actual reconfiguration timing. As another method, the base station may indicate that each subframe is included in a certain measurement set through a reconfiguration message (or may signal measurement (subframe) set indices and the like through DCI). Having received the corresponding signaling, the user equipment may perform measurement for each of the measurement (subframe) sets. And, the measurement window may be signaled by the base station or be set as a reconfiguration period or the like.

Device Configuration According to the Embodiments of the Present Invention

Figure 12:
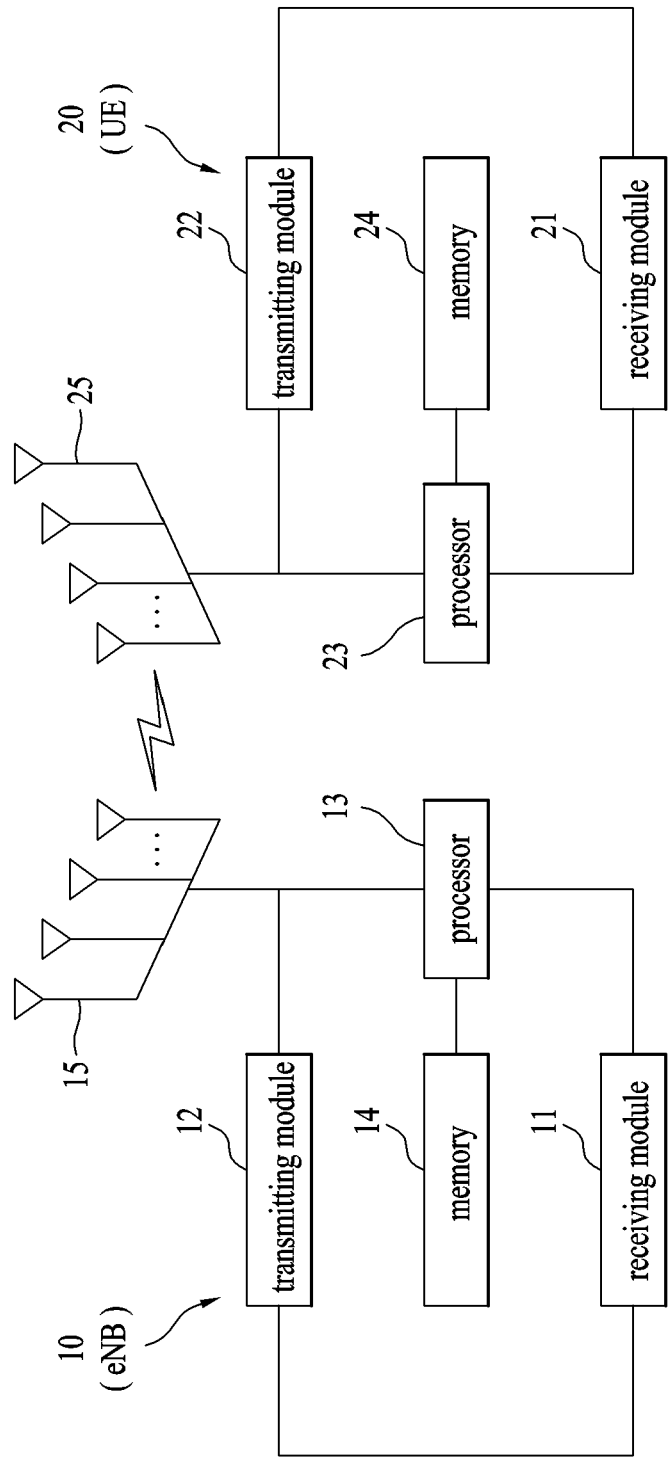
FIG. 12 is a diagram for configurations of transceiving devices.

FIG. 12 is a diagram for configurations of a transmitting point device and a user equipment device according to the present invention.

Referring to FIG. 12, a transmitting point device 10 according to the present invention may include a receiving module 11, a transmitting module 12, a processor 13, a memory 14 and a plurality of antennas 15. A plurality of the antennas 15 may mean a transmitting point device supportive of MIMO transmission and reception. The receiving module 11 can receive various signals, data and information in uplink from a user equipment. The transmitting module 12 can transmit various signals, data and information in downlink to the user equipment. And, the processor 13 can control overall operations of the transmitting point device 10.

The processor 13 of the transmitting point device 10 according to one embodiment of the present invention can process matters required for each of the embodiments mentioned in the foregoing description.

The processor 13 of the transmitting point device 10 performs functions of operating and processing information received by the transmitting point device 10, information to be externally transmitted by the transmitting point device 10, and the like. The memory 14 can store the operated and processed information and the like for a prescribed period and can be substituted with such a component as a buffer (not shown in the drawing) and the like.

Referring to FIG. 12, a user equipment device 20 according to the present invention may include a receiving module 21, a transmitting module 22, a processor 23, a memory 24 and a plurality of antennas 25. A plurality of the antennas 25 may mean a user equipment device supportive of MIMO transmission and reception. The receiving module 21 can receive various signals, data and information in downlink from a base station. The transmitting module 22 can transmit various signals, data and information in uplink to the base station. And, the processor 23 can control overall operations of the user equipment device 20.

The processor 23 of the user equipment device 20 according to one embodiment of the present invention can process matters required for each of the embodiments mentioned in the foregoing description.

The processor 23 of the user equipment device 20 performs functions of operating and processing information received by the user equipment device 20, information to be externally transmitted by the user equipment device 20, and the like. The memory 24 can store the operated and processed information and the like for a prescribed period and can be substituted with such a component as a buffer (not shown in the drawing) and the like.

The above-mentioned detailed configurations of the transmitting point device 10 and the user equipment device 20 can be implemented so that the contents or items explained in the descriptions of the various embodiments of the present invention may be independently applied or at least two embodiments of the present invention may be simultaneously applied. And, redundant descriptions shall be omitted from the following description for clarity.

The description of the transmitting point device 10 with reference to FIG. 12 may be identically applicable to a relay node device as a downlink transmitting entity or an uplink receiving entity. And, the description of the user equipment device 20 with reference to FIG. 12 may be identically applicable to a relay node device as a downlink receiving entity or an uplink transmitting entity.

The embodiments of the present invention mentioned in the foregoing description can be implemented using various means. For instance, the embodiments of the present invention can be implemented using hardware, firmware, software and/or any combinations thereof.

In case of the implementation by hardware, a method according to each of the embodiments of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each of the embodiments of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. For instance, the respective configurations disclosed in the aforementioned embodiments of the present invention can be used by those skilled in the art in a manner of being combined with each other. Therefore, the present invention is non-limited by the embodiments disclosed herein but intends to give a broadest scope that matches the principles and new features disclosed herein.

It will be apparent to those skilled in the art that the present invention may be embodied in other specific forms without departing from the spirit and essential characteristics of the invention. Thus, the above embodiments should be considered in all respects as exemplary and not restrictive. The scope of the present invention should be determined by reasonable interpretation of the appended claims and the present invention covers the modifications and variations of this invention that come within the scope of the appended claims and their equivalents. The present invention is non-limited by the embodiments disclosed herein but intends to give a broadest scope that matches the principles and new features disclosed herein. And, it is apparently understandable that an embodiment is configured by combining claims failing to have relation of explicit citation in the appended claims together or can be included as new claims by amendment after filing an application.

INDUSTRIAL APPLICABILITY

The embodiments of the present invention mentioned in the foregoing description can apply to various kinds of mobile communication systems.

What is claimed is:

1. A method of performing a measurement, which is performed by a user equipment in a wireless communication system, the method comprising:
receiving an uplink-downlink (UL-DL) configuration related to a $2^{nd}$ transmission point and a UL-DL configuration related to a $3^{rd}$ transmission point from a $1^{st}$ transmission point;
determining at least one or more measurement sets based on the received UL-DL configurations; and
performing the measurement on the at least one or more measurement sets,
wherein each of the at least one or more measurement sets comprises subframes with a same combination of a duplex direction in a specific time interval in accordance with the UL-DL configuration related to the $2^{nd}$ transmission point and a duplex direction in the specific time interval in accordance with the UL-DL configuration related to the $3^{rd}$ transmission point, and
wherein grouping is performed on measurement sets corresponding to a combination of specific duplex directions among the at least one or more measurement sets.

2. The method of claim 1, wherein in the each of the at least one or more measurement sets, measurement results of subframes included in a measurement window are calculated as an average value.

3. The method of claim 2, wherein if UL-DL configurations within the measurement window are reconfigured, the measurement results are calculated as the average value.

4. The method of claim 2, wherein if the UL-DL configurations relate to a usage change of an uplink subframe into a downlink subframe, the average value is calculated based on measurement results of subframes unrelated to the usage change only.

5. The method of claim 1, wherein the combination of the specific duplex directions is indicated by the $1^{st}$ transmission point.

6. The method of claim 1, wherein the subframes included in the each of the at least one or more measurement sets are used for downlink transmission from the $1^{st}$ transmission point.

7. The method of claim 1, wherein if the subframes included in the each of the at least one or more measurement sets are used for uplink transmission to the $1^{st}$ transmission point, uplink transmit power is independently determined in the each of the at least one or more measurement sets.

8. The method of claim 7, wherein at least one of an uplink transmit power parameter and a transmit power control mode is determined in the each of the at least one or more measurement sets.

9. The method of claim 1, wherein if the $2^{nd}$ transmission point corresponds to a dominant interferer, a measurement set is determined through a logical AND operation of downlink subframes in a measurement subframe set previously configured in each UL-DL configuration index of the $2^{nd}$ transmission point and a UL-DL configuration of the $1^{st}$ transmission point.

10. A user equipment for performing a measurement in a wireless communication system, the user equipment comprising:
    a radio frequency (RF) module; and
    a processor,
    wherein the processor is configured to:
        control the RF module to receive a UL-DL (uplink-downlink) configuration related to a $2^{nd}$ transmission point and a UL-DL configuration related to a $3^{rd}$ transmission point from a $1^{st}$ transmission point,
        determine at least one or more measurement sets based on the received UL-DL configurations, and
        perform the measurement on the at least one or more measurement sets,
    wherein each of the at least one or more measurement sets comprises subframes with a same combination of a duplex direction in a specific time interval in accordance with the UL-DL configuration related to the $2^{nd}$ transmission point and a duplex direction in the specific time interval in accordance with the UL-DL configuration related to the $3^{rd}$ transmission point, and
    wherein grouping is performed on measurement sets corresponding to a combination of specific duplex directions among the at least one or more measurement sets.

\* \* \* \* \*